United States Patent
Ashida et al.

(10) Patent No.: US 6,200,706 B1
(45) Date of Patent: *Mar. 13, 2001

(54) NONWOVEN FABRIC FOR SEPARATOR OF NON-AQUEOUS ELECTROLYTE BATTERY AND NON-AQUEOUS ELECTROLYTE BATTERY USING THE SAME

(75) Inventors: Tetsuya Ashida; Takahiro Tsukuda, both of Tokyo (JP)

(73) Assignee: Mitsubishi Paper Mills Limited, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/940,988

(22) Filed: Sep. 30, 1997

Related U.S. Application Data

(63) Continuation of application No. PCT/JP96/00859, filed on Mar. 29, 1996.

(30) Foreign Application Priority Data

| | | |
|---|---|---|
| Mar. 31, 1995 | (JP) | 7-075188 |
| May 9, 1995 | (JP) | 7-110553 |
| Jun. 22, 1995 | (JP) | 7-156156 |
| Jun. 27, 1995 | (JP) | 7-160535 |
| Sep. 20, 1995 | (JP) | 7-240393 |
| Sep. 20, 1995 | (JP) | 7-240394 |
| Nov. 30, 1995 | (JP) | 7-312809 |
| Dec. 22, 1995 | (JP) | 7-334485 |
| Mar. 19, 1996 | (JP) | 8-063078 |

(51) Int. Cl.[7] .................................... H01M 2/16
(52) U.S. Cl. ................ 429/249; 429/251; 429/247
(58) Field of Search ............................. 429/249, 251, 429/247

(56) References Cited

U.S. PATENT DOCUMENTS

| | | | |
|---|---|---|---|
| 5,075,990 | * 12/1991 | Greenberg et al. | 38/44 |
| 5,091,275 | * 2/1992 | Brecht et al. | 429/247 |
| 5,100,723 | * 3/1992 | Iwasaki et al. | 429/265 |
| 5,273,843 | 12/1993 | Fukuda et al. . | |
| 5,366,832 | * 11/1994 | Hayashi et al. | 429/249 |
| 5,380,580 | * 1/1995 | Rogers et al. | 428/219 |
| 5,900,336 | * 5/1999 | Kabata et al. | 429/231.4 |
| 5,922,492 | * 7/1999 | Takita et al. | 429/249 |

FOREIGN PATENT DOCUMENTS

| | | | |
|---|---|---|---|
| 52-124138 | 10/1977 | (JP) . | |
| 55-146871 | 11/1980 | (JP) . | |
| 55-146872 | 11/1980 | (JP) . | |
| 56-30256 | 3/1981 | (JP) . | |
| 56-594560 | 5/1981 | (JP) . | |
| 57-176666 | 10/1982 | (JP) . | |
| 59-180965 | 10/1984 | (JP) . | |
| 59-180966 | 10/1984 | (JP) . | |
| 63-102161 | 5/1988 | (JP) . | |
| 2-46649 | 2/1990 | (JP) . | |
| 2-181364 | 7/1990 | (JP) . | |
| 3-105851 | 5/1991 | (JP) . | |
| 3-156854 | 7/1991 | (JP) . | |
| 3-159059 | 7/1991 | (JP) . | |
| 5-74440 | 3/1993 | (JP) . | |
| 5-74442 | 3/1993 | (JP) . | |
| 50744400 | 3/1993 | (JP) . | |
| 5-335005 | 12/1993 | (JP) . | |
| 6-325747 | 11/1994 | (JP) . | |
| 07029561A | * 1/1995 | (JP) | H01M/2/16 |
| 7-37571 | 2/1995 | (JP) . | |
| 7-302584 | 11/1995 | (JP) . | |

* cited by examiner

Primary Examiner—Stephen Kalafut
Assistant Examiner—Angela J. Martin
(74) Attorney, Agent, or Firm—Pillsbury Winthrop LLP

(57) ABSTRACT

The object of the present invention is to provide a nonwoven fabric for separators of non-aqueous electrolyte batteries which is superior in adhesion to electrodes, causes no breakage of the separator and neither slippage nor space between electrode and the separator at the time of fabrication of battery, provides superior battery processability such as rollability with electrodes, causes no internal short-circuit due to contact between electrodes caused by shrinking or burning of the nonwoven fabric even when electrodes generate heat owing to external short-circuit, whereby ignition of the battery can be inhibited, has no pin holes and is superior in retention of electrolyte and penetration of electrolyte, and which can give non-aqueous electrolyte batteries superior in capacity, battery characteristics and battery storage characteristics. Specifically, the nonwoven fabric for separators of non-aqueous electrolyte batteries according to the present invention has a thickness non-uniformity index (Rpy) of 1000 mV or less or a center surface average roughness SRa of 6 μm or less in whole wavelength region as measured using a tracer method three-dimensional surface roughness meter.

21 Claims, No Drawings

NONWOVEN FABRIC FOR SEPARATOR OF NON-AQUEOUS ELECTROLYTE BATTERY AND NON-AQUEOUS ELECTROLYTE BATTERY USING THE SAME

This is a continuation of PCT/JP96/00859 filed on Mar. 29, 1996.

TECHNICAL FIELD

The present invention relates to a nonwoven fabric for separators of non-aqueous electrolyte batteries and a non-aqueous electrolyte battery using the same in which adhesion of separators to electrodes is superior; battery processability such as rollability with electrodes is excellent; no internal short-circuit is caused due to contact between electrodes brought about by shrinking or burning of the nonwoven fabric even when the electrodes generate heat by external short-circuit; thus, ignition of batteries can be prevented; and storage characteristics are excellent.

BACKGROUND

Hitherto, as separators for non-aqueous electrolyte batteries, for example, JP-A-6-325747 discloses microporous films comprising a high molecular weight polyethylene having an intrinsic viscosity [η] of 5 dl/g or higher. As separators for lithium cells, JP-A-3-105851 discloses microporous films comprising a composition composed of an ultra-high-molecular-weight polyethylene having a weight-average molecular weight of $7 \times 10^5$ or higher and a polyethylene having a weight-average molecular weight/number-average molecular weight of 10–300.

These separators have a shut-down function for preventing ignition of batteries. The shut-down function is a function to prevent ignition due to melting of Li when electrodes cause external short-circuit and a great current passes therethrough to generate heat and the battery temperature reaches 180° C. Specifically, separators melt before ignition of Li and result in clogging of open pore portions, whereby the battery reaction is stopped and generation of heat is inhibited. For example, the shut-down occurs at about 120° C. when a porous body of polyethylene is used as a separator and at about 140° C. when a porous body of polypropylene is used as a separator, and, as a result, generation of heat of battery stops to inhibit increase of temperature. However, in case much heat is generated which cannot be overcome by the shut-down function, melting of separator proceeds to cause complete melting of separators or cracking of separators, and as a result electrodes contact with each other, and thus a short-circuit current again flows, resulting in heat generation state, which leads to ignition.

Furthermore, these separators are relatively more uniform than the conventional nonwoven fabrics, but require complicated production steps and need high cost, and furthermore can hardly provide stable performance.

Recently, separators comprising nonwoven fabrics in place of microporous films are being developed from the points of easiness in production and stability of quality. For example, nonwoven fabrics for separators of batteries comprising specific fibers are disclosed in JP-A-5-74442 and JP-A-5-335005. However, when these nonwoven fabrics are used as separators, variation in thickness is greater than microporous films and adherence to electrodes constituting the batteries extremely decreases. Therefore, there is a problem that electrodes of sufficient volume cannot be incorporated into batteries in construction of batteries, and thus a satisfactory current capacity cannot be obtained when fabricated as a battery. Furthermore, in many cases, there occurs a slippage or a gap between electrode and separator in fabrication of batteries and processability is deteriorated.

The object of the present invention is to provide a nonwoven fabric for separators of non-aqueous electrolyte batteries and a non-aqueous electrolyte battery using the same in which adhesion of separators to electrodes is superior; there occurs no slippage or gap between electrode and separator; processability such as rollability with electrodes is excellent; no internal short-circuit occurs due to contact between electrodes or shrinking or burning of the nonwoven fabric even when the electrodes generate heat due to external short-circuit; ignition of batteries can be prevented; and a high current capacity and excellent battery characteristics and storage characteristics can be obtained.

DISCLOSURE OF INVENTION

The present first invention relates to a nonwoven fabric for separators of non-aqueous electrolyte batteries which is produced by a wet paper making process, characterized in that the nonwoven fabric has a thickness non-uniformity index (Rpy) of 1000 mV or less in machine direction, the Rpy being determined in the following manner.

Thickness non-uniformity index (Rpy): A sample is allowed to run between two spherical tracers. Variation of thickness of the sample in machine direction is measured using a film thickness measuring equipment which measures the variation of sample thickness as an electric signal through an electric micrometer by scanning the sample at a constant rate of 1.5 m/min in machine direction after zero point adjustment under the condition of ±15 μm/±3 V in sensitivity range of the electric micrometer. The resulting signal value is subjected to fast Fourier transform by a FFT analyzer using hanning window as a time window, and a power spectrum (unit: mV$^2$) is obtained by additive averaging of addition of 128 times. The power values in the frequency band of 2–25 Hz are totalled and the total is multiplied by $\frac{2}{3}$. The resulting value is raised to one-second power to obtain the thickness non-uniformity index (Rpy) (unit: mV).

The present second invention relates to a nonwoven fabric for separators of non-aqueous electrolyte batteries which is produced by a wet paper making process, characterized in that the nonwoven fabric has a center surface average roughness SRa of 6 μm or less in whole wavelength region measured using a tracer method three-dimensional surface roughness meter.

BEST MODE FOR CARRYING OUT THE INVENTION

As elements constituting the nonwoven fabric for separator of non-aqueous electrolyte battery according to the present invention, there are used materials such as inorganic fibers, whiskers, organic fibers, etc.

The inorganic fibers are preferably at least one kind of inorganic fibers selected from micro-glass fibers, alumina fibers, alumina-silica fibers and rock wools.

In the nonwoven fabric for separator of non-aqueous electrolyte battery characterized by containing a whisker comprising an inorganic compound, the composition of the whisker is preferably at least one member selected from $Al_2O_3$, $9Al_2O_3 \cdot 2B_2O_3$, SiC, $Si_3N_4$, $K_2O \cdot 6TiO_2$, $K_2Ti_6O_{13}$, $TiO_2$, $BaTiO_3$, $Mg_2B_2O_5$ and ZnO.

Average fiber diameter of the inorganic fibers is preferably 3 μm or less, and amount of the inorganic fibers in the nonwoven fabric is preferably 20–80% by weight.

The micro-glass fibers preferably comprise at least one of E glass containing 1% by weight or less of sodium oxide (in terms of $Na_2O$) and silica glass containing 99% by weight or more of silicon dioxide (in terms of $SiO_2$).

In the nonwoven fabric for separator of non-aqueous electrolyte batteries characterized by containing organic fibers, it is preferred that at least a part of the organic fibers are fibrillated to 1 μm or less in fiber diameter.

Furthermore, it is preferred that the nonwoven fabric contains organic fibers at least a part of which are fibrillated to 1 μm or less in fiber diameter and has a void content of 35–80%.

Furthermore, it is preferred that the nonwoven fabric for separator of non-aqueous electrolyte battery contains organic fibers at least a part of which are fibrillated to a fiber diameter of 1 μm or less and has a gas permeability of 100 mmHg or higher.

The organic fibers preferably contain one kind or more organic fibers selected from the group consisting of polypropylene fibers, polyethylene fibers, polymethylpentene fibers and acrylic fibers.

It is preferred to contain heat resistant organic fibers having a melting point or heat decomposition point of 25° C. or higher. The heat resistant organic fibers more preferably comprise one kind or more fibers selected from the group consisting of aramid fibers, polyphenylene sulfide fibers, polyarylate fibers, polyether ketone fibers, polyimide fibers, polyether sulfone fibers, and poly-p-phenylenebenzobisoxazole fibers.

It is preferred that the organic fibers contain a fibrous binder. More preferably, the fibrous binder is at least one fibrous binder selected from the group consisting of vinylon fibers, polyester fibers, polyolefin fibers, polyamide fibers and natural pulps.

Moreover, it is preferred that the nonwoven fabric of the present invention is a nonwoven fabric for separator of non-aqueous electrolyte battery, characterized in that the nonwoven fabric is subjected to a calender treatment. The calender treatment is preferably a hot calender treatment, and more preferably the hot calender treatment is carried out at a temperature of 50–200° C.

The nonwoven fabric for separator of non-aqueous electrolyte battery of the present invention will be explained in detail below.

The thickness non-uniformity index (Rpy) in the present invention is measured in the following manner: A sample is allowed to run between two spherical tracers. Variation of thickness of the sample in machine direction is measured using a film thickness measuring equipment which measures the variation of sample thickness as an electric signal through an electric micrometer by scanning the sample at a constant rate of 1.5 m/min in machine direction after zero point adjustment under the condition of ±15 μm/±3 V in sensitivity range of the electric micrometer. The resulting signal value is subjected to fast Fourier transform by a FFT analyzer using hanning window as a time window, and a power spectrum (unit: $mV^2$) is obtained by additive averaging of addition of 128 times. The power values in the frequency band of 2–25 Hz are totalled and the total is multiplied by ⅔. The resulting value is raised to one-second power to obtain the thickness non-uniformity index (Rpy) (unit: mV).

Specifically, it is obtained in the following manner. A sample is allowed to run between two spherical tracers having a diameter of 5 mm at a measuring pressure of about 30 g/stroke. Variation of thickness of the sample in machine direction is measured using a film thickness measuring equipment manufactured by Anritsu Co., Ltd. which measures the variation of sample thickness as an electric signal through an electric micrometer by scanning the sample at a constant speed of 1.5 m/min in machine direction after zero point adjustment under the condition of ±15 μm/±3 V in sensitivity range of the electric micrometer. The resulting signal value is subjected to fast Fourier transform (FFT) by a FFT analyzer CF-300 manufactured by Ono Sokuki Co., Ltd. (input signal AC ±10 mV, sampling 512 points) using hanning window as a time window under the condition of 50 Hz in frequency range, and a power spectrum (unit: $mV^2$) is obtained at a linear scale by addition averaging of addition of 128 times. Each of the power values at a linear scale in the frequency band of 2–25 Hz is squared and the resulting values are totalled. The total is multiplied by ⅔ and raised to one-second power. Thus, the Rpy can be obtained. Other processing conditions are according to the initial set conditions of CF-300 analyzer.

The nonwoven fabric for separator of non-aqueous electrolyte battery of the present invention has a thickness non-uniformity index Rpy of 1000 mV or less as specified in the present invention. The index Rpy is preferably 800 mV or less, more preferably 600 mV or less. When a nonwoven fabric having an index Rpy of more than 1000 mV is used as a separator of non-aqueous electrolyte battery, the separator is inferior in adhesion to electrode and, therefore, there occurs a slippage or a gap between electrode and separator at the time of fabrication of batteries, which deteriorates processability of batteries, and besides current capacity of the fabricated batteries is small.

It has been found that the object of the present invention can be attained when the nonwoven fabric for separator of non-aqueous electrolyte battery has a center surface average roughness SRa of 6 μm or less in machine direction in whole wavelength region as measured by a tracer method three-dimensional surface roughness meter.

The center surface average roughness SRa in whole wavelength region as measured by a tracer method three-dimensional surface roughness meter is defined by the following formula (1).

$$SRa = \frac{1}{Sa} \int_0^{Wx} \int_0^{Wy} \left| f(X, Y) \right| dX, dY \quad (1)$$

In the formula (1), Wx denotes a length of sample plane region in X-axis direction (machine direction), Wy denotes a length of plane region in Y-axis direction (perpendicular to the machine direction), and Sa denotes an area of sample plane region.

Specifically, SRa can be obtained under the conditions of cut-off value 0.8 mm, Wx=20 mm, Wy=8 mm, accordingly, Sa=160 $mm^2$ using SE-3AK type and SPA-11 type equipments manufactured by Kosaka Kenkyusho Co., Ltd. as the tracer method three-dimensional surface roughness meter and three-dimentional roughness analyzer, respectively. For data processing in X-axis direction, sampling is conducted at 500 points and for scanning in Y-axis direction, scanning of more than 17 lines is carried out.

The nonwoven fabric for separator of non-aqueous electrolyte battery of the present invention has a center surface average roughness SRa of 6 μm or less in whole wavelength region as measured by a tracer method three-dimensional surface roughness meter. The SRa is preferably 5 μm or less and more preferably 4 μm or less. When a nonwoven fabric having a center surface average roughness SRa of more than 6 μm is used as a separator of non-aqueous electrolyte battery, the surface roughness of the nonwoven fabric is great and the separator has a great ruggedness. Therefore, when the separator sandwiched between positive electrode and negative electrode are rolled or they are laminated in the form of a sheet and incorporated into a battery container, adhesion to both the electrodes is lowered to result in a large space between the separator and the electrodes. This space consequently causes decrease in volume of electrode to be incorporated into the same cell and the fabricated battery is low in current capacity. Moreover, the interval between the electrodes becomes non-uniform and this is not preferred from the point of uniformity of electrode reaction and causes deterioration of battery characteristics. When a nonwoven fabric having a center surface average roughness SRa of more than 6 μm is used as the separator of non-aqueous electrolyte battery, the current capacity conspicuously decreases to a practically unusable level. When a nonwoven fabric having a center surface average roughness SRa of 6 μm or less is used as the separator of non-aqueous electrolyte battery, the lower SRa is more preferred for improvement of battery characteristics and battery capacity, and 4 μm is more preferred to 5 μm.

The fibers used in the present invention are not limited as far as they can be made to a nonwoven fabric having an Rpy or an SRa in the range as specified in the present invention by a wet paper making process. However, the nonwoven fabric preferably comprises, in an adequate combination, inorganic fibers for improving heat resistance and organic fibers for improving formability into fabric and strength of nonwoven fabric.

As the inorganic fibers used preferably in the present invention, mention may be made of micro-glass fibers, glass fibers, alumina fibers, whisker fibers, etc. Among them, micro-glass fibers are preferred from the point of good dispersibility due to small fiber diameter. The micro-glass fibers are ultrafine glass fibers prepared by vapor-spray method, spinning method, flame-inserting method, rotary method or the like and generally have an average fiber diameter of 5 μm or less.

The average fiber diameter of micro-glass fibers is preferably 3 μm or less. By using micro-glass fibers of the smaller average fiber diameter, a nonwoven fabric of high uniformity can be produced without forming pin holes of about several ten Am to several hundred μm in diameter.

When glass fibers of large average fiber diameter are used in place of the micro-glass fibers, the resulting nonwoven fabric is non-uniform in thickness and has many pin holes. In the case of using this nonwoven fabric as a separator for non-aqueous electrolyte battery, electrical resistance in width direction of the separator becomes non-uniform and short-circuit between the electrodes is caused due to the pin holes.

Among the micro-glass fibers used for the nonwoven fabric for separator of non-aqueous electrolyte battery according to the present invention, more preferred are those which comprise E glass containing at most 1% by weight of sodium oxide (in terms of $Na_2O$). Generally used borosilicate glass is not preferred because it contains sodium of an alkali metal and a chemical reaction takes place between sodium and lithium which is a negative electrode active material, resulting in deterioration of battery characteristics. That is, it is considered that lithium ion is replaced with sodium ion constituting the micro-glass fibers and sodium is precipitated on the surface of lithium negative electrode, and as a result, internal resistance increases to deteriorate battery characteristics, especially, storage characteristics.

Micro-glass fibers comprising E-glass containing no sodium oxide or the like include, for example, E-FIBER commercially available from Schuller Co., Ltd. (U.S.A.).

For the same reason, as the micro-glass fibers in the nonwoven fabric for separator of non-aqueous electrolyte battery according to the present invention, those which comprise silica glass containing at least 99% by weight of silicon dioxide (in terms of $SiO_2$) are also preferred. By using micro-glass fibers which comprise silica glass containing at least 99% by weight of silicon dioxide (in terms of $SiO_2$), there occurs substantially no reduction of electromotive force during long-term storage of battery which often occurs when ordinary micro-glass fibers are used. The micro-glass fibers comprising the high purity silicon dioxide include, for example, those which are sold in the name of Q-FIBER from Schuller Co., Ltd. (U.S.A.).

The alumina fibers in the nonwoven fabric for separator of non-aqueous electrolyte battery according to the present invention are fibers mainly composed of alumina ($Al_2O_3$). As methods for the production of alumina fibers, mention may be made of inorganic salt method which comprises spinning a spinning solution comprising a mixture of an aqueous solution of an aluminum salt and a water-soluble polysiloxane, followed by firing at 1000° C. or higher in the air; sol method which comprises spinning an alumina sol or silica sol, followed by firing; precursor polymer method which comprises dry spinning a mixture of a solution containing polyaluminoxane and a silicate ester and firing the resulting precursor fibers at 1000° C. or higher in the air; and slurry method which comprises dry spinning a slurry containing α-$Al_2O_3$ fine powders of less than 0.5 μm, firing the resulting precursor fibers at 1000° C. or higher and further passing the fibers through a gas flame at 1500° C. to sinter the crystal grains.

The alumina fibers are, for example, those which are commercially available in the name of SAFFIL from ICI Co. (U.K.), in the name of DENKA ALCEN from Denki Kagaku Kogyo K.K., and in the name of RUBBYL from Nichias Co., Ltd.

The alumina.silica fibers used in the nonwoven fabric for separator of non-aqueous electrolyte battery according to the present invention are those which comprise 40–60% of alumina and 60–40% of silica, and these are produced, for example, by the following methods. An alumina.silica raw material such as kaolin calcination product, bauxite alumina, siliceous sand or silica powder to which is added, if necessary, borate glass, zirconia, chromium oxide or the like is molten at a high temperature. The resulting melt is made to fibers by blowing method which comprises blowing compressed air or steam jet to the melt or by spinning method which utilizes centrifugal force of a rotor rotating at high speed. These alumina.silica fibers are commercially available, for example, in the name of S FIBER SC from Shin-Nittetsu Chemical Co., Ltd. and in the name of FINE FLEX from Nichias Co., Lts.

The rock wools used in the nonwoven fabric for separator of non-aqueous electrolyte battery according to the present invention are produced, for example, by the following method. Blast-furnace slag as a main raw material to which silica, dolomite, limestone or the like is added and molten at 1500–1600° C. in an electric furnace, and the resulting homogeneous melt is made to fibers by dropping it on a high-speed rotator at 1400° C. These rock wools are, for example, commercially available in the name of S FIBER FF from Sin-Nittetsu Kagaku Kogyo Co., Ltd. and ROX-SAN FIBER from Asahi Fiber Glass Co., Ltd.

Amount of the inorganic fibers in the separator of non-aqueous electrolyte battery according to the present invention is preferably 20–80% by weight. If the amount of the inoragnic fibers is less than 20% by weight, heat resistance is deteriorated. If it is more than 80% by weight, strength of the nonwoven fabric decreases because inorganic fibers per se generally have no binding power.

Organic fibers used preferably in the present invention include those in the form of strand which are prepared from synthetic resins and, in addition, organic fibers at least a part of which are fibrillated to 1 $\mu$m or less in fiber diameter. These fibers also include heat resistant organic fibers having a melting point or heat decomposition temperature of 250° C. or higher and fibrous binders.

The organic fibers in the form of strand used in the present invention are preferably polyolefin fibers, polyester fibers and vinylon fibers (polyvinyl alcohol fibers) which are inactive in batteries. The polyolefin fibers are those which comprise polyolefin resins such as polyethylene and polypropylene. Not only the fibers in the form of strand, but also fibers in the form of pulp made by fibrillating polyolefin resins may be used. Furthermore, heat fusion bonding fibers comprising polyolefin resins can also be preferably used and they generally comprise two resins in combination. The core portion comprises a high-melting point resin such as polypropylene resin and the sheath portion comprises a low-melting point adhesive resin such as polyethylene resin, ethylene-vinyl alcohol copolymer resin or the like, and by heating them, fusion bonding between the fibers occurs to develop strength. Like polyolefin fibers, the polyester fibers and vinylon fibers can also be used in the form of fibrillation product or heat fusion bonding fibers as well as in the form of strand.

By using organic fibers at least a part of which are fibrillated to 1 $\mu$m or less in fiber diameter, a uniform nonwoven fabric for separator of non-aqueous electrolyte battery can be produced without formation of pin holes. Examples of the organic fibers at least a part of which are fibrillated to 1 $\mu$m or less in fiber diameter are those which are processed by the following methods.

Organic fibers cut to 5 mm or less, preferably 3 mm or less as a raw material are dispersed in water to prepare a suspension. Concentration of the suspension is at most 25% by weight, preferably 1–10% by weight, more preferably 1–2% by weight. This suspension is introduced into a high-pressure homogenizer used for preparation of emulsion or dispersion to apply a pressure of at least 100 kg/cm$^2$, preferably 200–500 kg/cm$^2$, more preferably 400–500 kg/cm$^2$ and the suspension is repeatedly allowed to pass through the homogenizer, during which a shearing force generated by allowing the suspension to collide against the homogenizer wall at high speed and rapidly reducing the speed is applied to the organic fibers. The effect of the application of shearing force is to split the fibers in the direction parallel to the fiber axis and loosen them and thus the fibers are gradually fibrillated.

The organic fibers to be fibrillated are preferably at least one kind of fibers selected from polypropylene fibers, polyethylene fibers, polymethylpentene fibers and acrylic fibers. Furthermore, heat resistant organic fibers are suitable and aramid fibers, polyarylate fibers and poly-p-phenylenebenzobisoxazole fibers are preferred. Especially preferred are polyarylate fibers and poly-p-phenylenebenzobisoxazole fibers.

The aramid fibers are those which are prepared by making to fibers poly-p-phenyleneterephthalamide, poly-p-benzamide, poly-p-amidehydrozide, poly-p-phenyleneterephthalamide-3,4-diphenyl ether terephthalamide, poly-m-phenyleneisophthalamide, etc. These are preferred because they are excellent not only in heat resistance, but also in strength.

The aramid fibers are, for example, those which are commercially available in the name of KEVLAR from Dupont.Toray.Kevlar or Teijin, Limited, TECHNORA and CONEX from Teijin, Limited, TWARON from Japan Aramide Co.

Polyolefin fibers such as polypropylene fibers, polyethylene fibers, polymethylpentene fibers, etc. and acrylic fibers are preferred because they are excellent in resistance to electrolyte. Polymethylpentene fibers are excellent also in heat resistance and are further preferred.

The polymethylpentene fibers are prepared by polymerizing 4-methylpentene-1 obtained by dimerization of propylene and then making the polymer to fibers.

The heat resistant organic fibers among the organic fibers used in the present invention mean fibers which do not melt or decompose even at 250° C. and are less in deterioration even after storage for more than 1 month in a high-temperature atmosphere of 200° C. More specifically, they include, for example, polyphenylene sulfide fibers, polyarylate fibers, polyether ketone fibers, polyimide fibers, polyether sulfone fibers, poly-p-phenylenebenzobisoxazole fibers, aramid fibers, polyamideimide fibers, and polyether imide fibers. Of these fibers, polyphenylene sulfide fibers, polyarylate fibers, polyether ketone fibers, polyimide fibers, polyether sulfone fibers and poly-p-phenylenebenzobisoxazole fibers are preferred because these have no adverse effect on battery characteristics and are superior in battery storage characteristics. Among them, for example, polyphenylene sulfide fibers are commercially available from Toray Industries, Inc. and polyarylate fibers are commercially available in the name of VECTRAN from Kuraray Co. Ltd. and EKONOL from Sumitomo Chemical Co., Ltd. and poly-p-phenylenebenzobisoxazole fibers are commercially available in the name of PBO FIBER from Toyobo Co., Ltd.

As the fibrous binders used in the present invention, there may be used alone or in combination those of so-called heat-melting type in which the fibers per se partially or wholly melt with heat to exhibit binding power between fibers, those of a type in which the fibers per se dissolve partially or wholly in water or hot water and binding power is produced between fibers in the drying process, those of a type in which binding power is produced by hydrogen bond between fibers, and those of a type in which binding power is produced between fibers by entanglement of fine fibers.

Preferred examples of the fibrous binders are vinylon fibers, polyester fibers, polyolefin fibers such as polypropylene fibers, polyethylene fibers, composite fibers comprising polyethylene and polypropylene, composite fibers comprising polypropylene and ethylene-vinyl alcohol copolymer and polyolefin synthetic pulps prepared from polyolefin resin, polyamide fibers and natural pulps. Vinylon fibers, polyolefin fibers containing polypropylene and polyamide fibers are more preferred because the resulting nonwoven fabric is high in strength and superior in heat resistance and resistance to electrolyte.

Length of fibers constituting the nonwoven fabric for separator of non-aqueous electrolyte battery in the present invention is not limited as far as they have a length enough to be able to be subjected to wet paper making, but it is preferably 1–30 mm. If the length of fibers is less than 1 mm, less interlocking of fibers occurs and, as a result, the strength provided by the heat fusion bonding is insufficient. On the other hand, if it is more than 30 mm, the fibers get tangled in the slurry and a uniform nonwoven fabric cannot be obtained. When such nonwoven fabric is used as a separator for non-aqueous electrolyte battery, the separator can hardly have Rpy or SRa in the range of the present invention, and the desired processability or battery characteristics cannot be obtained, and furthermore, electrical resistance becomes non-uniform.

The diameter of the fibers is preferably 5 deniers or less and more preferably 0.1–3 deniers. If the fiber diameter is more than 5 deniers, the number of fibers decreases and not only the strength of the nonwoven fabric decreases, but also uniformity deteriorates and pin holes are formed.

In making separators of non-aqueous electrolyte batteries, there may be used, in addition to the fibers, various additives for paper making, such as dispersing agent and thickening agent for attaining uniform and efficient production of the nonwoven fabric.

Inorganic binders such as colloidal silica and colloidal alumina may be applied to the nonwoven fabrics by coating or impregnation for the purpose of improving various performances required for separators of non-aqueous electrolyte batteries, such as strength, heat resistance and folding resistance. Furthermore, organic binders such as various water- soluble resins, oil-soluble resins and latexes may be used in place of the inorganic binders.

The basis weight of the nonwoven fabric for separators of non-aqueous electrolyte batteries is not limited, but is preferably 5–100 $g/m^2$, more preferably 10–50 $g/m^2$.

Thickness of the nonwoven fabric for separators of non-aqueous electrolyte batteries is not critical and the thinner nonwoven fabric is preferred because batteries can be made smaller. However, the thickness is preferably 10–100 μm, more preferably 20–60 μm from the points of strength, formation of no pin holes and uniformity. If the thickness is less than 10 μm, rejection rate due to short-circuit at fabrication of batteries increases. If the thickness is more than 100 μm, resistance depending on thickness increases to cause deterioration of battery characteristics and decrease of energy density.

There are various methods for producing nonwoven fabrics having a thickness non-uniformity index Rpy of 1000 mV or less, but generally they are produced by dispersing the fibers in water and then the dispersion is subjected to wet paper making process. In this case, the dispersion concentration of fibers is preferably as low as possible and the slurry concentration is preferably 0.01–0.1% by weight. Length of the fibers is preferably as short as possible within such a range as the fibers being able to be formed into a web. Furthermore, it is preferred to use an adequate amount of a dispersing agent depending on the fibers used.

Furthermore, various methods can be employed for the adjustment of thickness of the resulting nonwoven fabric and simultaneously for the reduction of thickness non-uniformity index Rpy. If the thickness of the resulting nonwoven fabric is greater than the desired thickness, the thickness must be reduced by a secondary processing. In this case, the thickness non-uniformity index can simultaneously be reduced. This secondary processing is preferably carried out by calendering treatment using supercalender, machine calender, hot calender, soft calender, hot soft calender, etc., whereby thickness and thickness non-uniformity index are adjusted. It is especially preferred to adjust to the desired thickness and the thickness non-uniformity index by pressure heat treatment using hot calender. The temperature for the pressure heat treatment in hot calendering varies depending on the kind of the organic fibers constituting the nonwoven fabric and the treatment is carried out at a temperature higher than Tg of the organic fibers and lower than the melting point of the organic fibers. Especially when heat fusion bonding fibers are contained, the temperature must be increased up to the bonding power developing temperature of the heat fusion bonding fibers. The temperature is preferably 50–200° C. from the points of constitution of the organic fibers, processing conditions, etc. When the pressure treatment is conducted at a temperature lower than 50° C., no sufficient bonding power is developed, the thickness increases again with lapse of time, the surface becomes rugged, the nonwoven fabric cannot be thinned to the desired thickness and cracks occur. In addition to these troubles, the thickness non-uniformity index cannot be improved. When the pressure treatment is carried out at higher than 200° C., the fibers per se are deteriorated with heat, resulting in reduction of strength or distortion. Even if the deterioration does not occur, density of the nonwoven fabric increases too much and a sufficient void content cannot be obtained to damage battery performances.

The void content is preferably in the range of 35–80%, within which electrolyte retention is superior and battery characteristics and battery storage characteristics are improved. The void content is more preferably 40–65% and this can be adjusted by the pressure heat treatment. Furthermore, when gas permeability is 100 mmHg or higher, penetration of electrolyte is satisfactory.

There are various methods for producing nonwoven fabrics having a center surface average roughness SRa of 6 μm or less, but generally they are produced by dispersing the fibers in water and then the dispersion is subjected to wet paper making process. In the production, the dispersion concentration of fibers is preferably as low as possible and the length of the fibers is preferably shorter. Furthermore, it is preferred to use a suitable amount of a dispersing agent depending on the fibers used.

Furthermore, various methods can be employed for reducing the center surface average roughness SRa of the resulting nonwoven fabric in addition to the adjustment of thickness. If the thickness of the resulting nonwoven fabric is greater than the desired thickness, the thickness must be reduced by a secondary processing treatment. In this case, the center surface average roughness SRa can simultaneously be reduced. In general, a nonwoven fabric having a thickness of 50–500 μm is adjusted in thickness to 10–100 μm by a secondary processing treatment.

This secondary processing treatment is preferably carried out by calendering treatment using supercalender, machine calender, hot calender, soft calender, hot soft calender, etc., whereby thickness and center surface average roughness are adjusted. It is especially preferred to adjust to the desired thickness and center surface average roughness SRa by pressure heat treatment using a hot calender.

The temperature for the pressure heat treatment in hot calendering varies depending on the kind of the organic fibers used for the nonwoven fabric and the treatment is carried out at a temperature higher than Tg of the organic fibers and lower than the melting point of the organic fibers. Especially when heat fusion bonding fibers are contained, the temperature must be increased up to the bonding power developing temperature of the heat fusion bonding fibers.

The temperature is preferably 50–200° C. from the points of constitution of the organic fibers, processing conditions, etc. When the pressure treatment is conducted at a temperature lower than 50° C., sufficient bonding power is not developed, the thickness increases again with lapse of time, the nonwoven fabric cannot be thinned to the desired thickness and cracks occur. In addition to these troubles, the SRa cannot be improved. When the pressure treatment is carried out at higher than 200° C., the fibers per se are deteriorated with heat, resulting in reduction of strength or distortion. Even if the deterioration does not occur, density of the nonwoven fabric increases too much and a sufficient void content cannot be obtained to damage battery performance.

The nonwoven fabric for separator of non-aqueous electrolyte battery of the present invention is preferably produced by wet paper making process because a uniform nonwoven fabric free from pin holes can be obtained. Paper machines used for the wet paper making process include Fourdrinier paper machine, cylinder paper machine, inclined type paper machine and combination machine comprising combination of 2 or more of these paper machines.

Since the nonwoven fabric for separator of non-aqueous electrolyte battery according to the present invention has a thickness non-uniformity index Rpy of 1000 mV or less or a center surface average roughness SRa of 6 $\mu$m or less in the whole wavelength region measured using a feeler type three-dimensional surface roughness meter, the nonwoven fabric is superior in adhesion to electrodes, there occurs no slippage or gap between the separator and electrodes in fabrication of battery, battery processability such as rollability with electrodes is excellent, and by using the nonwoven fabric of the present invention as a separator of non-aqueous electrolyte battery, a non-aqueous electrolyte battery excellent in current capacity, battery characteristics and battery storage characteristics can be produced. The nonwoven fabric for separator of non-aqueous electrolyte battery according to the present invention can be obtained by producing a uniform nonwoven fabric by a wet paper making process, and if Rpy and SRa of the resulting nonwoven fabric are not the desired values, they can be adjusted to the desired values by secondary processing treatments such as calendering treatment using machine calender or soft calender, hot calendering treatment and hot soft calendering. Furthermore, when the nonwoven fabric for separator of non-aqueous electrolyte battery according to the present invention contains inorganic fibers such as micro-glass fibers, alumina fibers, alumina silica fibers and rock wools or heat resistant organic fibers, since the fabric is excellent in heat resistance, even if battery temperature rises owing to external short-circuit of electrodes, shrinking or burning of the nonwoven fabric does not occur and ignition of the battery can be prevented. Moreover, when the micro-glass fibers which constitute the nonwoven fabric for separator of non-aqueous electrolyte battery do not contain sodium oxide which hinders the battery reaction, the resulting non-aqueous electrolyte battery is markedly superior in battery storage characteristics. Furthermore, when the organic fibers which constitute the nonwoven fabric for separator of non-aqueous electrolyte battery are those at least a part of which are fibrillated to 1 $\mu$m or less in fiber diameter, formation of pin holes which cause internal short-circuit can be prevented.

The following nonlimiting examples explain the present invention in more detail. The "%" means "% by weight" of the fibers constituting the nonwoven fabric of the present invention.

Evaluation was conducted by the following test methods in the examples and comparative examples, and the results are shown in Tables 1–9.

Items of evaluation:

<Battery processability>

Lithium cobaltate was used as a positive electrode active material and graphitized carbon was used as a negative electrode, and the nonwoven fabric made in the following examples and comparative examples was used as a separator of non-aqueous electrolyte battery. The separator was arranged in contact with the electrodes and the whole was made to electrodes of spiral structure. Then, $LiClO_4$ was dissolved at a concentration of 0.5 mol/l in a mixed solution of propylene carbonate:1,2-dimethoxyethane=1:1 to prepare an electrolyte. A cylindrical lithium battery of 18650 type (diameter: 18 mm and length: 65 mm) was made using the electrodes and the electrolyte. Processability was evaluated by examining uniformity, space, meander and slippage between the electrode and the separator. The results were graded by the following criteria.

○: Processing could be performed without any problems such as formation of space, meander and slippage, and the separator and electrodes could be uniformly produced.

X: There were problems in processability and the separator and electode were non-uniform.

Δ: There were some problems in processability, but they were practically acceptable.

In all items, the mark "-" means "unmeasurable".

<Capacity>

A cylindrical lithium battery made in the same manner as above for making the battery used for testing and evaluating <Battery processability> was subjected to full charging at a constant voltage of 4.1 V, and then the capacity of the battery was measured. The greater capacity indicates the higher performance of the secondary battery.

<Battery characteristics>

A cylindrical lithium battery made in the same manner as above for making the battery used for testing and evaluating <Battery processability> was subjected to full charging at a constant voltage of 4.1 V and, thereafter, battery characteristics were evaluated. This was mainly evaluation of the initial battery characteristics. In the discharge characteristic curve obtained by measuring the relation between the battery voltage and the discharge time, the flatter curve indicates the better results. The results were graded by the following criteria.

○: Discharging was good.

Δ: Discharging was somewhat bad, but practically acceptable.

X: Discharging was bad, namely, the voltage greatly reduced.

<Battery storage battery>

A cylindrical lithium battery made in the same manner as above for making the battery used for testing and evaluating <Battery processability> was stored at 60° C. for 3 months, and, thereafter, battery characteristics (discharge characteristics) were measured and the battery storage characteristics were evaluated in the same manner as in the evaluation of <Battery characteristics> from the discharge characteristic curve. The results were graded by the following criteria.

○: Good.

Δ: Somewhat bad, but practically acceptable.

X: Bad.

<Heat resistance>

The nonwoven fabric produced in the examples and comparative examples was sandwiched between an upper metallic plate electrode and a lower metallic plate electrode, and connected to an electrical resistance measuring apparatus so as to be able to measure electrical resistance. The nonwoven fabric sandwiched between the metallic plates was placed in an electric furnace and the temperature was elevated up to 500° C., and temperature and electrical resistance were measured. When temperature rose and the nonwoven fabric shrank, melted or burnt and could not serve as a separator, electrical resistance decreased and finally short-circuit occurred. The temperature at which the short-circuit occurs was employed as a scale of heat resistance. When this temperature was higher than 180° C., heat resistance was good and when this was 120–180° C., the heat resistance was somewhat inferior, but practically acceptable. When it was lower than 120° C., the heat resistance was bad. When short-circuit did not occur up to 500° C., this was indicated by "500<" in the table.

<Gas permeability>

Gas permeability was measured using Smooster (Model SM-6A) manufactured by Toei Denshi Kogyo Co., Ltd. Since the upper limit of gas permeability measurable by this equipment is 720 mmHg, when the measured value exceeded 720 mmHg, "720<" was indicated in the table.

<Void content>

Void content was obtained from the following formula.

$$\text{Void content (\%)}=(1-(M/T)/D)\times 100$$

In the above formula, M denotes basis weight (g/m$^2$), T denotes thickness ($\mu$m) and D denotes specific gravity (g/cm$^3$) of the nonwoven fabric.

<Electrolyte retention characteristics>

When the nonwoven fabric produced in the examples and the comparative examples was dipped in the electrolyte prepared above for testing and evaluating <Battery processability>, holding amount of the electrolyte was determined. The greater amount indicates the better retention of electrolyte. The results were graded by the following criteria.

◯: Good.

Δ: Somewhat bad, but practically acceptable.

X: Bad.

<Electrolyte penetrability>

The nonwoven fabric produced in the examples and the comparative examples was cut to 10 cm×10 cm. This was dipped in the electrolyte prepared above for testing and evaluating <Battery processability>, and the time required for the electrolyte penetrating into the nonwoven fabric was measured to evaluate the electrolyte penetrability. The faster penetration of the electrolyte means the better electrolyte penetrability. The results were graded by the following criteria.

◯: Good.

Δ: Somewhat bad, but practically acceptable.

X: Bad.

<Pin holes>

The nonwoven fabric obtained in the examples and the comparative examples was visually observed to determine whether there were through holes or not.

<Ignition>

One hundred batteries mentioned above were made and external-circuited using a test circuit which shows a resistance of 10 milli-ohms when the short-circuit occurs, and it was examined whether the batteries got to ignite or not. When no batteries ignited, this is indicated by ◯ and when even one battery ignited, this is indicated by X.

EXAMPLE 1

50% of polypropylene fibers (PZ manufactured by Daiwa Spinning Co., Ltd.; 0.7 d×5 mm) and 50% of polyolefin heat fusion bonding fibers (NBF-H manufactured by Daiwa Spinning Co., Ltd.; 0.7 d×5 mm) were dispersed in water to prepare a slurry of 0.01% in concentration. The resulting slurry was subjected to wet paper making process by a cylinder paper machine with using somewhat higher wet pressing pressure at the wet part to make a nonwoven fabric of 22 g/m$^2$ in basis weight and 50 $\mu$m in thickness for separator of non-aqueous electrolyte battery.

EXAMPLE 2

A nonwoven fabric of 35 g/m$^2$ in basis weight and 80 $\mu$m in thickness for separator of non-aqueous electrolyte battery was made in the same manner as in Example 1. The resulting nonwoven fabric was further subjected to a pressure heat treatment at 140° C. by hot calender treatment to adjust the thickness to 50 $\mu$m.

EXAMPLE 3

40% of micro-glass fibers having an average fiber diameter of 1.0 $\mu$m (#108A manufactured by Schuller Co., Ltd.), 30% of polypropylene fibers (PZ manufactured by Daiwa Spinning Co., Ltd.; 0.7 d×5 mm) and 30% of polyolefin heat fusion bonding fibers (NBF-H manufactured by Daiwa Spinning Co., Ltd.; 0.7 d×5 mm) were dispersed in water to prepare a slurry. The resulting slurry was subjected to wet paper making process by a cylinder paper machine to make a nonwoven fabric of 25 g/m$^2$ in basis weight and 90 $\mu$m in thickness for separator of non-aqueous electrolyte battery. The resulting nonwoven fabric was further subjected to a pressure heat treatment at 140° C. by hot calendering to adjust the thickness to 50 $\mu$m.

The components of the glass fibers used in this example were as follows:

| <Components of glass fibers> | |
|---|---|
| $SiO_2$ | 58.55% |
| $B_2O_2$ | 10.5% |
| $Na_2O$ | 10.1% |
| $Al_2O_3$ | 5.8% |
| BaO | 5.0% |
| ZnO | 4.0% |
| $K_2O$ | 3.2% |
| CaO | 1.9% |
| $F_2$ | 0.6% |
| MgO | 0.3% |
| $Fe_2O_3$ | 0.04% |
| $TiO_2$ | 0.01% |

EXAMPLE 4

40% of micro-glass fibers having an average fiber diameter of 0.65 $\mu$m and comprising 99.8% of silicon dioxide (Q-FIBER #106Q manufactured by Schuller Co., Ltd.), 30% of polypropylene fibers (PZ manufactured by Daiwa Spinning Co., Ltd.; 0.7 d×5 mm) and 30% of polyolefin heat fusion bonding fibers (NBF-H manufactured by Daiwa Spinning Co., Ltd.; 0.7 d×5 mm) were dispersed in water to prepare a slurry. The resulting slurry was subjected to wet paper making process by a cylinder paper machine to make a nonwoven fabric of 25 g/m² in basis weight and 90 μm in thickness for separator of non-aqueous electrolyte battery. The resulting nonwoven fabric was further subjected to a hot calender treatment at 140° C. to adjust the thickness to 50 μm.

EXAMPLE 5

The nonwoven fabric for separator of non-aqueous electrolyte battery made in the same manner as in Example 1 was subjected to a hot calender treatment with changing only the hot calendering condition to a temperature 40° C. to adjust the thickness to 50 μm. The nonwoven fabric had dents on the surface.

EXAMPLE 6

The nonwoven fabric for separator of non-aqueous electrolyte battery made in the same manner as in Example 4 was subjected to a hot calender treatment with changing only the calendering temperature to 210° C. to adjust the thickness to 50 μm. The surface of the nonwoven fabric partially filmed.

EXAMPLE 7

50% of polypropylene fibers (PZ manufactured by Daiwa Spinning Co., Ltd.; 2 d×5 mm) and 50% of polyolefin heat fusion bonding fibers (NBF-H manufactured by Daiwa Spinning Co., Ltd.; 2 d×5 mm) were dispersed in water to prepare a slurry. The resulting slurry was subjected to wet paper making process by a cylinder paper machine to make a nonwoven fabric of 18 g/m² in basis weight and 50 μm in thickness for separator of non-aqueous electrolyte battery.

EXAMPLE 8

40% of micro-glass fibers having an average fiber diameter of 4.0 μm (#112 manufactured by Schuller Co., Ltd.), 30% of polypropylene fibers (PZ manufactured by Daiwa Spinning Co., Ltd.; 2 d×5 mm) and 30% of polyolefin heat fusion bonding fibers (NBF-H manufactured by Daiwa Spinning Co., Ltd.; 2 d×5 mm) were dispersed in water to prepare a slurry. The resulting slurry was subjected to wet paper making process by a cylinder paper machine to make a nonwoven fabric of 25 g/m² in basis weight and 90 μm in thickness for separator of non-aqueous electrolyte battery. The resulting nonwoven fabric was subjected to a hot calender treatment at 140° C. to adjust the thickness to 50 μm.

TABLE 1

| | Thickness non-uniformity index Rpy (mv) | Battery process-ability | Battery capacity (mAh) | Battery storage character-istics | Heats regestance (° C.) |
|---|---|---|---|---|---|
| Example 1 | 920 | Δ | 750 | ○ | 160 |
| Example 2 | 550 | ○ | 820 | ○ | 160 |
| Example 3 | 530 | ○ | 860 | Δ | 500 |
| Example 4 | 480 | ○ | 980 | ○ | 500 |
| Example 5 | 970 | Δ | 700 | ○ | 500 |
| Example 6 | 220 | ○ | 720 | ○ | 500 |
| Example 7 | 1250 | X | 450 | ○ | 160 |
| Example 8 | 1100 | X | 480 | Δ | 500 |

Evaluation:

As can be seen from the results of Table 1, the nonwoven fabrics for separator of non-aqueous electrolyte batteries made in Examples 1–6 according to the present invention were low in thickness non-uniformity index Rpy and superior in adhesion to electrodes. Therefore, battery processability such as rollability with electrodes was superior and non-aqueous electrolyte batteries high in capacity could be produced. Since in Example 1 the hot calender treatment was not carried out and in Example 5 the treating temperature was 40° C. and the effect of hot calender treatment was low, the battery processability such as rollability with electrodes was somewhat inferior.

On the other hand, the nonwoven fabrics for separator of non-aqueous electrolyte batteries made in Examples 7 and 8 were high in thickness non-uniformity index Rpy and inferior in adhesion to electrodes and hence, battery processability such as rollability with electrodes was inferior. Therefore, the resulting non-aqueous electrolyte batteries were low in capacity. In Examples 3 and 8, the micro-glass fibers contained sodium oxide which hinders battery reaction and, therefore, the battery storage characterisitcs were somewhat inferior.

EXAMPLE 9

65% of polypropylene fibers (PZ manufactured by Daiwa Spinning Co., Ltd.; 0.7 d×5 mm) and 35% of polyolefin heat fusion bonding fibers (NBF-H manufactured by Daiwa Spinning Co., Ltd.; 0.7 d×5 mm) were mixed and dispersed in water to prepare a slurry. The resulting slurry was subjected to wet paper making process by a cylinder paper machine with using somewhat higher wet pressing pressure at the wet part to make a nonwoven fabric of 25 g/m² in basis weight and 50 μm in thickness for separator of non-aqueous electrolyte battery.

EXAMPLE 10

A nonwoven fabric of 30 g/m² in basis weight and 100 μm in thickness for separator of non-aqueous electrolyte battery was produced in the same manner as in Example 9, except that the wet pressing pressure was normal pressure. The nonwoven fabric was further subjected to a hot calender treatment at 130° C. to adjust the thickness to 50 μm.

EXAMPLE 11

50% of the micro-glass fibers used in Example 3, 25% of polypropylene fibers (PZ manufactured by Daiwa Spinning Co., Ltd.; 0.7 d×5 mm) and 25% of polyolefin heat fusion bonding fibers (NBF-H manufactured by Daiwa Spinning Co., Ltd.; 0.7 d×5 mm) were dispersed in water to prepare a slurry. The resulting slurry was subjected to wet paper making process by a cylinder paper machine to obtain a nonwoven fabric of 25 g/m² in basis weight and 100 μm in thickness for separator of non-aqueous electrolyte battery. Then, the nonwoven fabric was subjected to a hot calender treatment at 130° C. to adjust the thickness to 50 μm.

EXAMPLE 12

50% of the micro-glass fibers used in Example 4, 25% of polypropylene fibers (PZ manufactured by Daiwa Spinning Co., Ltd.; 0.7 d×5 mm) and 25% of polyolefin heat fusion bonding fibers (NBF-H manufactured by Daiwa Spinning Co., Ltd.; 0.7 d×5 mm) were dispersed in water to prepare a slurry. The resulting slurry was subjected to wet paper making process by a cylinder paper machine to obtain a nonwoven fabric of 25 g/m² in basis weight and 90 μm in thickness for separator of non-aqueous electrolyte battery. Then, the nonwoven fabric was subjected to a hot calender treatment at 130° C. to adjust the thickness to 50 μm.

EXAMPLE 13

The nonwoven fabric for separator of non-aqueous electrolyte battery made in the same manner as in Example 12 was subjected to a hot calender treatment with changing only the calendering temperature to 40° C. to adjust the thickness to 50 μm. The nonwoven fabric had dents on the surface.

EXAMPLE 14

The nonwoven fabric for separator of non-aqueous electrolyte battery made in the same manner as in Example 12 was subjected to a hot calender treatment with changing only the calendering temperature to 210° C. to adjust the thickness to 50 μm. The surface of the nonwoven fabric partially filmed to hinder penetration of electrolyte.

EXAMPLE 15

60% of polypropylene fibers (PZ manufactured by Daiwa Spinning Co., Ltd.; 2 d×5 mm) and 40% of polyolefin heat fusion bonding fibers (NBF-H manufactured by Daiwa Spinning Co., Ltd.; 2 d×5 mm) were mixed and dispersed in water to prepare a slurry. The resulting slurry was subjected to wet paper making process by a cylinder paper machine to obtain a nonwoven fabric of 17 g/m$^2$ in basis weight and 50 μm in thickness for separator of non-aqueous electrolyte battery.

EXAMPLE 16

50% of the micro-glass fibers used in Example 8, 25% of polypropylene fibers (PZ manufactured by Daiwa Spinning Co., Ltd.; 2 d×5 mm) and 25% of polyolefin heat fusion bonding fibers (NBF-H manufactured by Daiwa Spinning Co., Ltd.; 2 d×5 mm) were mixed and dispersed in water to prepare a slurry. The resulting slurry was subjected to wet paper making process by a cylinder paper machine to obtain a nonwoven fabric of 25 g/m$^2$ in basis weight and 110 μm in thickness for separator of non-aqueous electrolyte battery. Then, the nonwoven fabric was subjected to a hot calender treatment at 140° C. to adjust the thickness to 50 μm.

TABLE 2

|  | Center surface average roughness SRa (μm) | Battery process-ability | Battery capacity (mAh) | Battery storage character-istics | Heats regestance (° C.) |
|---|---|---|---|---|---|
| Example 9 | 5.5 | Δ | 700 | ○ | 160 |
| Example 10 | 2.0 | ○ | 980 | ○ | 160 |
| Example 11 | 3.3 | ○ | 860 | Δ | 500< |
| Example 12 | 2.7 | ○ | 920 | ○ | 500< |
| Example 13 | 4.8 | Δ | 750 | ○ | 500< |
| Example 14 | 1.8 | ○ | 720 | ○ | 500< |
| Example 15 | 6.5 | X | 490 | ○ | 160 |
| Example 16 | 8.0 | X | 400 | Δ | 500< |

Evaluation:

As can be seen from the results of Table 2, the nonwoven fabrics for separator of non-aqueous electrolyte batteries made in Examples 9–14 according to the present invention had a low center surface average roughness SRa and were superior in adhesion to electrodes. Therefore, they were superior in battery processability such as rollability with electrodes, and non-aqueous electrolyte batteries high in capacity and superior in battery storage characteristics could be produced. Since in Example 9 the hot calender treatment was not carried out and in Example 13 the treating temperature was 40° C. and the effect of hot calender treatment was low, the battery processability such as rollability with electrodes was somewhat inferior.

On the other hand, the nonwoven fabrics for separator of non-aqueous electrolyte batteries made in Examples 15 and 16 were high in center surface average roughness SRa and inferior in adhesion to electrodes. Therefore, they were inferior in battery processability such as rollability with electrodes and the resulting non-aqueous electrolyte batteries were low in current capacity. In Examples 11 and 16, the micro-glass fibers contained sodium oxide which hinders battery reaction and, therefore, the battery storage characteristics were somewhat inferior.

EXAMPLE 17

90% of micro-glass fibers having an average fiber diameter of 2.7 μm (#110 manufactured by Schuller Co., Ltd.) and 10% of vinylon fibers (VPB107-1×3 manufactured by Kuraray Co., Ltd.) as a fibrous binder were mixed and dispersed in water to prepare a slurry. The resulting slurry was subjected to wet paper making process by a cylinder paper machine to make a nonwoven fabric of 20 g/m$^2$ in basis weight and 50 μm in thickness for separator of non-aqueous electrolyte battery. This nonwoven fabric had an Rpy of 950 mV and an SRa of 5.8 μm.

EXAMPLE 18

80% of micro-glass fibers used in Example 3 and 20% of core-sheath composite fibers comprising polypropylene and polyethylene (NBF-H manufactured by Daiwa Spinning Co., Ltd.; 2 d×10 mm in fiber length) as a fibrous binder were mixed and dispersed in water to prepare a slurry. The resulting slurry was subjected to wet paper making process by a cylinder paper machine to make a nonwoven fabric of 20 g/m$^2$ in basis weight and 70 μm in thickness for separator of non-aqueous electrolyte battery. Then, the nonwoven fabric was subjected to a hot calender treatment at 130° C. to adjust the thickness to 30 μm. This nonwoven fabric had an Rpy of 600 mV and an SRa of 3.5 μm.

EXAMPLE 19

A nonwoven fabric of 20 g/m$^2$ in basis weight and 30 μm in thickness for separator of non-aqueous electrolyte battery was produced in the same manner as in Example 18, except that the amounts of the micro-glass fibers used in Example 3 and NBF-H (manufactured by Daiwa Spinning Co., Ltd.; 2 d×10 mm in fiber length) as a fibrous binder were 20% and 80%, respectively. This nonwoven fabric had an Rpy of 570 mV and an SRa of 3.4 μm.

EXAMPLE 20

40% of micro-glass fibers used in Example 3, and 40% of NBF-H (manufactured by Daiwa Spinning Co., Ltd.; 2 d×10 mm in fiber length) and 20% of vinylon fibers (VPB107-1×3 manufactured by Kuraray Co., Ltd.) as fibrous binders were mixed and dispersed in water to prepare a slurry. The resulting slurry was subjected to wet paper making process by a cylinder paper machine to make a nonwoven fabric of 20 g/m$^2$ in basis weight and 70 μm in thickness for separator of non-aqueous electrolyte battery. Then, the nonwoven fabric was subjected to a hot calender treatment at 130° C. to adjust the thickness to 30 μm. This nonwoven fabric had an Rpy of 560 mV and an SRa of 3.3 μm.

EXAMPLE 21

100% of the micro-glass fibers used in Example 17 were dispersed in water to prepare a slurry. The slurry was subjected to wet paper making process. However, the resulting nonwoven fabric was very low in strength because fibrous binder was not used.

EXAMPLE 22

100% of vinylon fibers (VPB107-1×3 manufactured by Kuraray Co., Ltd.) as a fibrous binder were dispersed in water to prepare a slurry. The resulting slurry was subjected to wet paper making process by a cylinder paper machine, but the fibrous binder melted to result in a filmy product.

EXAMPLE 23

10% of micro-glass fibers used in Example 3 and 90% of NBF-H (manufactured by Daiwa Spinning Co., Ltd.; 0.7 d×10 mm in fiber length) as a fibrous binder were dispersed in water to prepare a slurry. The resulting slurry was subjected to wet paper making process by a cylinder paper machine to make a nonwoven fabric of 20 g/m² in basis weight and 70 μm in thickness for separator of non-aqueous electrolyte battery. Then, the nonwoven fabric was subjected to a hot calender treatment at 140° C. to adjust the thickness to 35 μm. The surface of the nonwoven fabric became filmy.

EXAMPLE 24

80% of glass fibers having an average fiber diameter of 6 μm (manufactured by Asahi Fiber Glass Co., Ltd.; fiber length: 6 mm) and 20% of NBF-H (manufactured by Daiwa Spinning Co., Ltd.; 0.7 d×10 mm in fiber length) as a fibrous binder were dispersed in water to prepare a slurry. The resulting slurry was subjected to wet paper making process by a cylinder paper machine to make a nonwoven fabric of 20 g/m² in basis weight and 100 μm in thickness for separator of non-aqueous electrolyte battery. This nonwoven fabric had an Rpy of 1100 mV and an SRa of 6.5 μm.

EXAMPLE 25

A nonwoven fabric for separator of non-aqueous electrolyte battery of 20 g/m² in basis weight and 100 μm in thickness for separator of non-aqueous electrolyte battery was made in the same manner as in Comparative Example 24. Then, this nonwoven fabric was subjected to a hot calender treatment at 130° C. to adjust the thickness to 50 μm. This nonwoven fabric had an Rpy of 1000 mV and an SRa of 6.1 μm.

EXAMPLE 26

A nonwoven fabric of 20 g/m² in basis weight and 60 μm in thickness for separator of non-aqueous electrolyte battery was produced in the same manner as in Example 17, except that the amounts of the micro-glass fibers and vinylon fibers (VPB107-1×3 manufactured by Kuraray Co., Ltd.) as a fibrous binder were 95% and 5%, respectively.

EXAMPLE 27

A nonwoven fabric of 20 g/m² in basis weight and 30 μm in thickness for separator of non-aqueous electrolyte battery was produced in the same manner as in Example 20, except that the amounts of the micro-glass fibers used in Example 3, NBF-H (manufactured by Daiwa Spinning Co., Ltd.; 2 d×10 mm) and vinylon fibers (VPB107-1×3 manufactured by Kuraray Co., Ltd.) as fibrous binders were 30%, 50% and 20%, respectively.

TABLE 3

|  | Battery process-ability | Battery character-istics | Battery storage character-istics | Heat re-sistance (° C.) | Pin holes | Ig-nition |
|---|---|---|---|---|---|---|
| Example 17 | ○ | ○ | Δ | 500< | No | ○ |
| Example 18 | ○ | ○ | Δ | 500< | No | ○ |
| Example 19 | ○ | ○ | Δ | 250 | No | ○ |
| Example 20 | ○ | ○ | Δ | 500 | No | ○ |
| Example 21 | X | — | — | 500< | No | — |
| Example 22 | ○ | X | X | 200 | No | X |
| Example 23 | ○ | Δ | Δ | 165 | No | X |
| Example 24 | X | Δ | Δ | 500< | Formed | X |
| Example 25 | X | Δ | Δ | 500< | Formed | X |
| Example 26 | X | Δ | Δ | 500< | No | X |
| Example 27 | ○ | ○ | Δ | 400 | No | ○ |

Evaluation:

The nonwoven fabrics for separator of non-aqueous electrolyte batteries of Examples 17–20 and 27 were superior in battery processability such as rollability with electrodes, and non-aqueous electrolyte batteries superior in battery characteristics could be made. Since the nonwoven fabrics contained micro-glass fibers, they were excellent in heat resistance and did not shrink or burn owing to melting of the fibers even when battery temperature rose due to external short-circuit. Thus, ignition of batteries could be prevented. Furthermore, the micro-glass fibers contained sodium oxide which hinders battery reaction and, therefore, the battery storage characteristics were somewhat inferior.

On the other hand, the nonwoven fabric for separator of non-aqueous electrolyte batteries of Example 21 was composed of only micro-glass fibers and, therefore, excellent in heat resistance, but since micro-glass fibers have no self-binding power, strength of the nonwoven fabric much decreased to often cause troubles of breakage at the time of fabrication of batteries. Thus, battery processability was very bad and non-aqueous electrolyte batteries could not be stably produced.

The nonwoven fabric for separator of non-aqueous electrolyte battery of Example 22 was composed of only vinylon fibers which are fibrous binder and, therefore, became filmy. Thus, penetration of electrolyte was inferior and the resulting non-aqueous electrolyte batteries were inferior in battery characteristics and battery storage characteristics. Furthermore, since the nonwoven fabric was inferior in heat resistance, the fibers melted when battery temperature rose due to external short-circuit, resulting in shrink of the nonwoven fabric to cause internal-short circuit owing to contact between electrodes to generate heat, which led to ignition.

Since the nonwoven fabric for separator of non-aqueous electrolyte batteries of Example 23 contained a small amount, namely, 10% of the micro-glass fibers, it was inferior in heat resistance, and the fibers melted when battery temperature rose due to external short-circuit, resulting in shrink of the nonwoven fabric to cause internal-short circuit owing to the contact between electrodes to generate heat, which led to ignition. Furthermore, content of vinylon fibers was high, namely, 90%, the surface of the nonwoven fabric filmed, and thus penetration of electrolyte was inferior and the resulting non-aqueous electrolyte batteries were inferior in battery characteristics and battery storage characteristics.

Since the nonwoven fabrics for separator of non-aqueous electrolyte batteries of Examples 24 and 25 contained glass fibers, they were superior in heat resistance. However, since the average fiber diameter was large, namely, 6 µm, the thickness of the nonwoven fabric was uneven, and not only the battery processability such as rollability with electrodes was inferior, but when they were used as separators of non-aqueous electrolyte battery, electrical resistance of the separators in width direction became non-uniform and the resulting non-aqueous electrolyte batteries were somewhat inferior in battery characteristics and battery storage characteristics. Furthermore, the nonwoven fabrics had pin holes and when they were incorporated into batteries, internal-short circuit was caused and, sometimes, ignition resulted.

Since the nonwoven fabric for separator of non-aqueous electrolyte batteries of Example 26 contained 95% of microglass fibers, it was superior in heat resistance, but low in strength, and therefore the nonwoven fabric was apt to break at the time of fabrication of battery to cause internal short-circuit and, sometimes, ignition occurred.

EXAMPLE 28

80% of alumina fibers (SAFFIL RF manufactured by ICI Co., Ltd.) and 20% of p-aramid fibers at least a part of which were fibrillated to 1 µm or less in fiber diameter (TYARA KY-400S manufactured by Daicel Kagaku K.K.) were mixed and dispersed in water to prepare a slurry. The resulting slurry was subjected to wet paper making process by a cylinder paper machine to make a nonwoven fabric of 30 g/m² in basis weight and 95 µm in thickness for separator of non-aqueous electrolyte battery.

Components of the alumina fibers used in this Example were as follows:

| <Components of alumina fibers> | |
|---|---|
| $Al_2O_3$ | 96% |
| $SiO_2$ | 4% |

EXAMPLE 29

70% of alumina fibers used in Example 28 and 30% of polyethylene fibers at least a part of which were fibrillated to 1 µm or less in fiber diameter (TYARA KY-420S manufactured by Daicel Ltd.) were mixed and dispersed in water to prepare a slurry. The resulting slurry was subjected to wet paper making process by a cylinder paper machine to make a nonwoven fabric of 25 g/m² in basis weight and 85 µm in thickness for separator of non-aqueous electrolyte battery. This nonwoven fabric had an Rpy of 980 mV and an SRa of 5.8 µm.

EXAMPLE 30

50% of alumina fibers used in Example 28 and 50% of polypropylene fibers at least a part of which were fibrillated to 1 µm or less in fiber diameter (TYARA KY-430S manufactured by Daicel Ltd.) were mixed and dispersed in water to prepare a slurry. The resulting slurry was subjected to wet paper making process by a cylinder paper machine to make a nonwoven fabric of 20 g/m² in basis weight and 70 µm in thickness for separator of non-aqueous electrolyte battery. This nonwoven fabric had an Rpy of 960 mV and an SRa of 5.7 µm.

EXAMPLE 31

70% of alumina fibers used in Example 28, 20% of p-aramid fibers at least a part of which were fibrillated to 1 µm or less in fiber diameter (TYARA KY-400S manufactured by Daicel Ltd.) and 10% of vinylon fibers (VPB107-1×3 manufactured by Kuraray Co., Ltd.) were mixed and dispersed in water to prepare a slurry. The resulting slurry was subjected to wet paper making process by a cylinder paper machine to make a nonwoven fabric of 30 g/m² in basis weight and 90 µm in thickness for separator of non-aqueous electrolyte battery.

EXAMPLE 32

75% of alumina silica fibers (S FIBER SC BULK 1400B manufactured by Shin-Nittetsu Chemical Co., Ltd.) and 25% of p-aramid fibers at least a part of which were fibrillated to 1 µm or less in fiber diameter (TYARA KY-400S manufactured by Daicel Ltd.) were mixed and dispersed in water to prepare a slurry. The slurry was subjected to wet paper making process by a cylinder paper machine to make a nonwoven fabric of 30 g/m² in basis weight and 90 µm in thickness for separator of non-aqueous electrolyte battery.

Components of the alumina.silica fibers used in this Example were as follows:

| <Components of alumina-silica fibers> | |
|---|---|
| $Al_2O_3$ | 42.5% |
| $SiO_2$ | 55.0% |
| $Cr_2O_3$ | 2.5% |

EXAMPLE 33

70% of alumina.silica fibers used in Example 32 and 30% of polyethylene fibers at least a part of which were fibrillated to 1 µm or less in fiber diameter (TYARA KY-420S manufactured by Daicel Ltd.) were mixed and dispersed in water to prepare a slurry. The resulting slurry was subjected to wet paper making process by a cylinder paper machine to make a nonwoven fabric of 25 g/m² in basis weight and 85 µm in thickness for separator of non-aqueous electrolyte battery.

EXAMPLE 34

80% of alumina.silica fibers used in Example 32 and 20% of polypropylene fibers at least a part of which were fibrillated to 1 µm or less in fiber diameter (TYARA KY-430S manufactured by Daicel Ltd.) were mixed and dispersed in water to prepare a slurry. The resulting slurry was subjected to wet paper making process by a cylinder paper machine to make a nonwoven fabric of 20 g/m² in basis weight and 70 µm in thickness for separator of non-aqueous electrolyte battery.

EXAMPLE 35

70% of alumina.silica fibers used in Example 32, 20% of polypropylene fibers at least a part of which were fibrillated to 1 µm or less in fiber diameter (TYARA KY-430S manufactured by Daicel Ltd.) and 10% of vinylon fibers (VPB107-1×3 manufactured by Kuraray Co., Ltd.) were mixed and dispersed in water to prepare a slurry. The resulting slurry was subjected to wet paper making process by a cylinder paper machine to make a nonwoven fabric of 20 g/m² in basis weight and 70 µm in thickness for separator of non-aqueous electrolyte battery.

EXAMPLE 36

70% of rock wool (S FIBER FF manufactured by Shin-Nittetsu Chemical Co., Ltd.) and 30% of polyethylene fibers at least a part of which were fibrillated to 1 μm or less in fiber diameter (TYARA KY-420S manufactured by Daicel Ltd.) were mixed and dispersed in water to prepare a slurry. The resulting slurry was subjected to wet paper making process by a cylinder paper machine to make a nonwoven fabric of 30 g/m² in basis weight and 100 μm thick for separator of non-aqueous electrolyte battery.

EXAMPLE 37

70% of the rock wool used in Example 36 and 30% of p-aramid fibers at least a part of which were fibrillated to 1 μm or less in fiber diameter (TYARA KY-400S manufactured by Daicel Ltd.) were mixed and dispersed in water to prepare a slurry. The resulting slurry was subjected to wet paper making process by a cylinder paper machine to make a nonwoven fabric of 30 g/m² in basis weight and 100 μm thick for separator of non-aqueous electrolyte battery.

EXAMPLE 38

70% of the rock wool used in Example 36, 20% of polyethylene fibers at least a part of which were fibrillated to 1 μm or less in fiber diameter (TYARA KY-420S manufactured by Daicel Ltd.) and 10% of vinylon fibers (VPB107-1×3 manufactured by Kuraray Co., Ltd.) were mixed and dispersed in water to prepare a slurry. The resulting slurry was subjected to wet paper making process by a cylinder paper machine to make a nonwoven fabric of 30 g/m² in basis weight and 95 μm thick for separator of non-aqueous electrolyte battery. This nonwoven fabric had an Rpy of 965 mV and an SRa of 5.7 μm.

EXAMPLE 39

35% of the alumina fibers used in Example 28, 35% of the rock wool used in Example 36 and 30% of p-aramid fibers at least a part of which were fibrillated to 1 μm or less in fiber diameter (TYARA KY-400S manufactured by Daicel Ltd.) were mixed and dispersed in water to prepare a slurry. The resulting slurry was subjected to wet paper making process by a cylinder paper machine to make a nonwoven fabric of 30 g/m² in basis weight and 95 μm thick for separator of non-aqueous electrolyte battery.

EXAMPLE 40

100% of the alumina fibers used in Example 28 were dispersed in water to prepare a slurry, and the slurry was subjected to wet paper making process by a cylinder paper machine. However, the resulting nonwoven fabric was considerably low in strength because the alumina fibers had no self-binding power.

EXAMPLE 41

100% of p-aramid fibers at least a part of which were fibrillated to 1 μm or less in fiber diameter (TYARA KY-400S manufactured by Daicel Ltd.) were dispersed in water to prepare a slurry. The resulting slurry was subjected to wet paper making process by a cylinder paper machine to make a nonwoven fabric of 30 g/m² in basis weight and 100 μm thick for separator of non-aqueous electrolyte battery.

EXAMPLE 42

100% of polyethylene fibers at least a part of which were fibrillated to 1 μm or less in fiber diameter (TYARA KY-420S manufactured by Daicel Ltd.) were dispersed in water to prepare a slurry. The resulting slurry was subjected to wet paper making process by a cylinder paper machine to make a nonwoven fabric of 30 g/m² in basis weight and 100 μm thick for separator of non-aqueous electrolyte battery.

EXAMPLE 43

70% of the alumina fibers used in Example 28 and 30% of core-sheath composite fibers comprising polypropylene and ethylene-vinyl alcohol copolymer (NBF-E manufactured by Daiwa Spinning Co., Ltd.; 2 d×5 mm in fiber length) as non-fibrillated organic fibers were dispersed in water to prepare a slurry. The resulting slurry was subjected to wet paper making process by a cylinder paper machine to make a nonwoven fabric of 30 g/m² in basis weight and 110 μm thick for separator of non-aqueous electrolyte battery.

EXAMPLE 44

70% of the micro-glass fibers used in Example 3 (#108A manufactured by Shuller Co., Ltd.) and 30% of p-aramid fibers at least a part of which were fibrillated to 1 μm or less in fiber diameter (TYARA KY-400S manufactured by Daicel Ltd.) were dispersed in water to prepare a slurry. The resulting slurry was subjected to wet paper making process by a cylinder paper machine to make a nonwoven fabric of 30 g/m² in basis weight and 95 μm thick for separator of non-aqueous electrolyte battery.

EXAMPLE 45

50% of the alumina fibers used in Example 28, 20% of the micro-glass fibers used in Example 3 and 30% of p-aramid fibers at least a part of which were fibrillated to 1 μm or less in fiber diameter were mixed and dispersed in water to prepare a slurry. The resulting slurry was subjected to wet paper making process by a cylinder paper machine to make a nonwoven fabric of 30 g/m² in basis weight and 95 μm thick for separator of non-aqueous electrolyte battery.

EXAMPLE 46

50% of the alumina fibers used in Example 28, 20% of micro-glass fibers having an average fiber diameter of 4 μm and comprising 99.8% of silicon dioxide (Q-FIBER 112Q manufactured by Schuller Co., Ltd.) and 30% of polyethylene fibers at least a part of which were fibrillated to 1 μm or less in fiber diameter (TYARA KY-420S manufactured by Daicel Ltd.) were mixed and dispersed in water to prepare a slurry. The resulting slurry was subjected to wet paper making process by a cylinder paper machine to make a nonwoven fabric of 30 g/m² in basis weight and 95 μm thick for separator of non-aqueous electrolyte battery.

EXAMPLE 47

50% of the alumina fibers used in Example 28, 20% of the micro-glass fibers used in Example 4 and 30% of polyethylene fibers at least a part of which were fibrillated to 1 μm or less in fiber diameter (TYARA KY-420S manufactured by Daicel Ltd.) were dispersed in water to prepare a slurry. The resulting slurry was subjected to wet paper making process by a cylinder paper machine to make a nonwoven fabric of 30 g/m² in basis weight and 95 μm thick for separator of non-aqueous electrolyte battery. This nonwoven fabric had an Rpy of 950 mV and an SRa of 5.7 μm.

EXAMPLE 48

50% of the alumina.silica fibers used in Example 32, 30% of micro-glass fibers having an average fiber diameter of 1

μm and comprising E glass (E-FIBER 108E manufactured by Schuller Co., Ltd.) and 20% of polypropylene fibers at least a part of which were fibrillated to 1 μm or less in fiber diameter (TYARA KY-430S manufactured by Daicel Ltd.) were dispersed in water to prepare a slurry. The resulting slurry was subjected to wet paper making process by a cylinder paper machine to make a nonwoven fabric of 25 g/m² in basis weight and 80 μm thick for separator of non-aqueous electrolyte battery. This nonwoven fabric had an Rpy of 950 mV and an SRa of 5.7 μm.

The components of the micro-glass fibers used in this Example were as follows:

| <Components of the micro-glass fibers> | |
|---|---|
| $SiO_2$ | 54.4% |
| CaO | 17.4% |
| $Al_2O_3$ | 14.1% |
| $B_2O_3$ | 8.0% |
| MgO | 4.7% |
| $TiO_2$ | 0.5% |
| $Na_2O$ | 0.4% |
| $Fe_2O_3$ | 0.3% |

EXAMPLE 49

70% of the micro-glass fibers used in Example 3 and 30% of p-aramid fibers at least a part of which were fibrillated to 1 μm or less in fiber diameter (TYARA KY-400S manufactured by Daicel Ltd.) were dispersed in water to prepare a slurry. The resulting slurry was subjected to wet paper making process by a cylinder paper machine to make a nonwoven fabric of 30 g/m² in basis weight and 100 μm thick for separator of non-aqueous electrolyte battery.

EXAMPLE 50

80% of the alumina fibers used in Example 28 and 20% of p-aramid fibers at least a part of which were fibrillated to 1 μm or less in fiber diameter (TYARA KY-400S manufactured by Daicel Ltd.) were dispersed in water to prepare a slurry. The resulting slurry was subjected to wet paper making process by a cylinder paper machine to make a nonwoven fabric of 30 g/m² in basis weight and 95 μm thick for separator of non-aqueous electrolyte battery.

EXAMPLE 51

50% of the alumina fibers used in Example 28 and 50% of the micro-glass fibers used in Example 4 were dispersed in water to prepare a slurry. The resulting slurry was subjected to wet paper making process by a cylinder paper machine, but the resulting nonwoven fabric was considerably low in strength because the alumina fibers and the micro-glass fibers had no self-binding power.

TABLE 4

| | Battery process-ability | Battery character-istics | Battery storage character-istics | Heat re-sistance (° C.) | Pin holes | Ig-nition |
|---|---|---|---|---|---|---|
| Example 28 | ◯ | ◯ | ◯ | 500< | No | ◯ |
| Example 29 | ◯ | ◯ | ◯ | 500< | No | ◯ |
| Example 30 | ◯ | ◯ | ◯ | 500< | No | ◯ |
| Example 31 | ◯ | ◯ | ◯ | 500< | No | ◯ |
| Example 32 | ◯ | ◯ | ◯ | 500< | No | ◯ |
| Example 33 | ◯ | ◯ | ◯ | 500< | No | ◯ |
| Example 34 | ◯ | ◯ | ◯ | 500< | No | ◯ |
| Example 35 | ◯ | ◯ | ◯ | 500< | No | ◯ |
| Example 36 | ◯ | ◯ | ◯ | 500< | No | ◯ |
| Example 37 | ◯ | ◯ | ◯ | 500< | No | ◯ |
| Example 38 | ◯ | ◯ | ◯ | 500< | No | ◯ |
| Example 39 | ◯ | ◯ | ◯ | 500< | No | ◯ |
| Example 40 | X | — | — | 500< | Formed | — |
| Example 41 | X | Δ | ◯ | 300 | No | X |
| Example 23 | X | Δ | ◯ | 120 | No | X |
| Example 43 | Δ | Δ | ◯ | 500< | Formed | X |
| Example 44 | ◯ | ◯ | Δ | 500< | No | ◯ |
| Example 45 | ◯ | ◯ | Δ | 500< | No | ◯ |
| Example 46 | Δ | Δ | ◯ | 500< | No | ◯ |
| Example 47 | ◯ | ◯ | ◯ | 500< | No | ◯ |
| Example 48 | ◯ | ◯ | ◯ | 500< | No | ◯ |
| Example 49 | ◯ | ◯ | Δ | 500< | No | ◯ |
| Example 50 | ◯ | ◯ | ◯ | 500< | No | ◯ |
| Example 51 | X | — | — | 500< | Formed | — |

Evaluation:

The nonwoven fabrics for separator of non-aqueous electrolyte batteries of Examples 28–39 and 45–50 were superior in battery processability such as rollability with electrodes, and non-aqueous electrolyte batteries superior in battery characteristics and battery storage characteristics could be made. Since the nonwoven fabrics contained inorganic fibers, they were excellent in heat resistance and did not shrink or burn owing to melting of the fibers even when battery temperature rose due to external short-circuit. Thus, ignition of batteries could be inhibited. Furthermore, since the nonwoven fabrics contained organic fibers at least a part of which were fibrillated to 1 μm or less in fiber diameter, there were no pin holes which cause internal short-circuit. The nonwoven fabric of Example 46 contained glass fibers having a large fiber diameter and, therefore, the thickness was somewhat uneven and battery processability and battery characteristics were somewhat inferior.

On the other hand, the nonwoven fabric for separator of non-aqueous electrolyte batteries of Example 40 was composed of only alumina fibers having no self-binding power and, therefore, strength of the nonwoven fabric was very low to cause breakage at the time of fabrication of batteries. Thus, battery processability was inferior and non-aqueous electrolyte batteries could not be stably produced.

The nonwoven fabric for separator of non-aqueous electrolyte batteries of Example 41 was composed of only p-aramid fibers at least a part of which were fibrillated to 1 μm or less in fiber diameter and, therefore, there were no pin holes and the fabric was superior in heat resistance, but very low in mechanical strength. Thus, the nonwoven fabric was readily broken and inferior in battery processability, and the resulting non-aqueous electrolyte batteries were somewhat inferior in battery characteristics and the batteries resulted in internal short-circuit and sometimes ignition occurred. Since the nonwoven fabric for separator of non-aqueous electrolyte batteries of Example 42 was composed of only polyethylene fibers at least a part of which were fibrillated to 1 μm or less in fiber diameter, there were no pin holes, but the fabric was low in heat resistance and very low in strength. Therefore, the nonwoven fabric was readily broken and the resulting non-aqueous electrolyte batteries made using the nonwoven fabric resulted in internal short-circuit and sometimes ignition occurred.

Since the nonwoven fabric for separator of non-aqueous electrolyte batteries of Example 43 contained 70% of alumina fibers, it was superior in heat resistance, but since it did not contain organic fibers at least a part of which were fibrillated to 1 μm or less in fiber diameter, there were pin holes and the non-aqueous electrolyte batteries made using the nonwoven fabrics were somewhat inferior in battery characteristics and battery storage characteristics. Furthermore, the batteries resulted in internal short-circuit and sometimes ignition occurred.

Since the nonwoven fabrics for separator of non-aqueous electrolyte batteries of Examples 44, 45 and 49 contained micro-glass fibers, they were superior in heat resistance. However, since the micro-glass fibers contained sodium oxide, non-aqueous electrolyte batteries made using the nonwoven fabrics were somewhat inferior in battery storage characteristics.

Since the nonwoven fabric for separator of non-aqueous electrolyte batteries of Example 51 was composed of alumina fibers and micro-glass fibers having no self-binding power, it was very low in strength and troubles such as breakage often occurred at the time of fabrication of batteries. Thus, non-aqueous electrolyte batteries cannot be stably made.

EXAMPLE 52

85% of the micro-glass fibers used in Example 48 (E-FIBER, 108E manufactured by Schuller Co., Ltd.) and 15% of NBF-H (manufactured by Daiwa Spinning Co., Ltd.; 0.7 d×5 mm in fiber length) as a fibrous binder were dispersed in water to prepare a slurry. The resulting slurry was subjected to wet paper making process by a cylinder paper machine to make a nonwoven fabric of 15 g/m$^2$ in basis weight and 50 μm thick for separator of non-aqueous electrolyte battery.

EXAMPLE 53

A nonwoven fabric for separator of non-aqueous electrolyte battery was obtained in the same manner as in Example 52, except that amount of the micro-glass fibers was 70% and that of the fibrous binder was 30%.

EXAMPLE 54

A nonwoven fabric for separator of non-aqueous electrolyte battery was obtained in the same manner as in Example 52, except that amount of the micro-glass fibers was 50% and that of the fibrous binder was 50%.

EXAMPLE 55

A nonwoven fabric for separator of non-aqueous electrolyte battery was obtained in the same manner as in Example 52, except that amount of the micro-glass fibers was 15% and that of the fibrous binder was 85%.

EXAMPLE 56

70% of micro-glass fibers having an average fiber diameter of 1.0 μm and 30% of NBF-H (manufactured by Daiwa Spinning Co., Ltd.; 0.7 d×5 mm in fiber length) as a fibrous binder were dispersed in water to prepare a slurry. The resulting slurry was subjected to wet paper making process by a cylinder paper machine to make a nonwoven fabric of 15 g/m$^2$ in basis weight and 50 μm thick for separator of non-aqueous electrolyte battery.

Components of the micro-glass fibers used in this Example were shown below. They did not contain $Na_2O$.

| <Components of the micro-glass fibers> | |
| --- | --- |
| $SiO_2$ | 54.4 ± 0.5 |
| $Al_2O_3$ | 14.9 ± 0.4 |
| CaO | 16.6 ± 0.3 |
| MgO | 4.6 ± 0.3 |
| $B_2O_5$ | 8.5 ± 0.3 |
| $Fe_2O_3$ | <0.5 |

EXAMPLE 57

85% of the micro-glass fibers having an average fiber diameter of 0.5 μm and having the same composition as used in Example 48 (E-FIBER, 104E manufactured by Schuller Co., Ltd.) and 15% of NBF-H (manufactured by Daiwa Spinning Co., Ltd.; 0.7 d×5 mm in fiber length) as a fibrous binder were dispersed in water to prepare a slurry. The resulting slurry was subjected to wet paper making process by a cylinder paper machine to make a nonwoven fabric of 20 g/m$^2$ in basis weight and 70 μm thick for separator of non-aqueous electrolyte battery. This nonwoven fabric was subjected to a hot calender treatment at 140° C. to adjust the thickness to 40 μm.

EXAMPLE 58

A slurry having the same components as in Example 57 was prepared and subjected to wet paper making process by a cylinder paper machine to make a nonwoven fabric of 20 g/m$^2$ in basis weight and 70 μm thick for separator of non-aqueous electrolyte battery. This nonwoven fabric was subjected to a super calender treatment at 25° C. to adjust the thickness to 50 μm. Some dents were formed on the surface.

EXAMPLE 59

70% of the micro-glass fibers used in Example 48 and 30% of polyester fibers (4080 manufactured by Unitika Ltd.; 2 d×5 mm in fiber length) as a fibrous binder were dispersed in water to prepare a slurry. The resulting slurry was subjected to wet paper making process by a cylinder paper machine to make a nonwoven fabric of 20 g/m$^2$ in basis weight and 70 μm thick for separator of non-aqueous electrolyte battery. This nonwoven fabric was subjected to hot calender treatment at 120° C. to adjust the thickness to 40 μm.

EXAMPLE 60

A nonwoven fabric for separator of non-aqueous electrolyte battery was made in the same manner as in Example 53, except that the average fiber diameter of the micro-glass fibers was 4 μm.

EXAMPLE 61

80% of the micro-glass fibers having an average fiber diameter of 2.7 μm and comprising 99.8% of silicon dioxide (Q-FIBER 110Q manufactured by Schuller Co., Ltd.) and 20% of NBF-H (manufactured by Daiwa Spinning Co., Ltd.; 0.7 d×5 mm in fiber length) as a fibrous binder were dispersed in water to prepare a slurry. The resulting slurry was subjected to wet paper making process by a cylinder paper machine to make a nonwoven fabric of 20 g/m$^2$ in basis weight and 70 μm thick for separator of non-aqueous electrolyte battery.

EXAMPLE 62

70% of the micro-glass fibers used in Example 4 and 30% of NBF-H (manufactured by Daiwa Spinning Co., Ltd.; 0.7 d×5 mm in fiber length) as a fibrous binder were dispersed in water to prepare a slurry. The resulting slurry was subjected to wet paper making process by a cylinder paper machine to make a nonwoven fabric of 20 g/m² in basis weight and 70 μm thick for separator of non-aqueous electrolyte battery.

EXAMPLE 63

100% of the micro-glass fibers used in Example 52 were dispersed in water to prepare a slurry. The resulting slurry was subjected to wet paper making process by a cylinder paper machine to make a nonwoven fabric for separator of non-aqueous electrolyte battery, but the nonwoven fabric was very low in strength because it did not contain the fibrous binder.

EXAMPLE 64

85% of micro-glass fibers having an average fiber diameter of 1.8 μm (108B manufactured by Schuller Co., Ltd.) and 15% of NBF-H (manufactured by Daiwa Spinning Co., Ltd.; 0.7 d×5 mm in fiber length) as a fibrous binder were dispersed in water to prepare a slurry. The resulting slurry was subjected to wet paper making process by a cylinder paper machine to make a nonwoven fabric of 20 g/m² in basis weight and 60 μm thick for separator of non-aqueous electrolyte battery.

Components of the micro-glass fibers used in this Example were as follows.

| <Components of the micro-glass fibers> | |
|---|---|
| $SiO_2$ | 58.55 |
| $B_2O_5$ | 10.5 |
| $Na_2O$ | 10.1 |
| $Al_2O_3$ | 5.8 |
| BaO | 5.0 |
| ZnO | 4.0 |
| $K_2O$ | 3.2 |
| CaO | 1.9 |
| $F_2$ | 0.6 |
| MgO | 0.3 |
| $Fe_2O_3$ | 0.04 |
| $TiO_2$ | 0.01 |

EXAMPLE 65

85% of micro-glass fibers having an average fiber diameter of 0.65 μm (#106 manufactured by Schuller Co., Ltd.) and 15% of NBF-H (manufactured by Daiwa Spinning Co., Ltd.; 0.7 d×5 mm in fiber length) as a fibrous binder were dispersed in water to prepare a slurry. The resulting slurry was subjected to wet paper making process by a cylinder paper machine to make a nonwoven fabric of 20 g/m² in basis weight and 70 μm thick for separator of non-aqueous electrolyte battery.

Components of the micro-glass fibers used in this Example were as follows.

| <Components of the micro-glass fibers> | |
|---|---|
| $SiO_2$ | 65.21 |
| $Na_2O$ | 15.73 |
| CaO | 5.92 |
| $B_2O_5$ | 5.20 |
| $Al_2O_3$ | 3.56 |
| MgO | 2.69 |
| $F_2$ | 0.83 |
| $K_2O$ | 0.81 |
| $SO_3$ | 0.19 |
| $Fe_2O_3$ | 0.059 |

TABLE 5

| | Battery process-ability | Battery character-istics | Battery storage character-istics | Heat resistance (° C.) | Ignition |
|---|---|---|---|---|---|
| Example 52 | Δ | Δ | ◯ | 500< | ◯ |
| Example 53 | ◯ | ◯ | ◯ | 500< | ◯ |
| Example 54 | ◯ | ◯ | ◯ | 500< | ◯ |
| Example 55 | ◯ | ◯ | ◯ | 250 | ◯ |
| Example 56 | ◯ | ◯ | ◯ | 500< | ◯ |
| Example 57 | ◯ | ◯ | ◯ | 500< | ◯ |
| Example 58 | Δ | Δ | ◯ | 500< | ◯ |
| Example 59 | ◯ | ◯ | ◯ | 500< | ◯ |
| Example 60 | X | Δ | ◯ | 500< | ◯ |
| Example 61 | ◯~Δ | ◯ | ◯ | 500< | ◯ |
| Example 62 | ◯ | ◯ | ◯ | 500< | ◯ |
| Example 63 | — | — | — | 500< | — |
| Example 64 | Δ | Δ | Δ | 500< | ◯ |
| Example 65 | Δ | Δ | Δ | 500< | ◯ |

Evaluation:

As can be seen from the results of Table 5, the nonwoven fabrics for separator of non-aqueous electrolyte batteries of Examples 52–62 according to the present invention were superior in battery processability such as rollability with electrodes, and non-aqueous electrolyte batteries superior in battery characteristics and battery storage characteristics could be made. Since the nonwoven fabrics contained micro-glass fibers, they were excellent in heat resistance and did not shrink or burn owing to melting of the fibers even when battery temperature rose due to external short-circuit. Thus, ignition of batteries could be inhibited. Furthermore, since the nonwoven fabrics contained micro-glass fibers containing no sodium oxide or the like which hinders battery reaction, battery storage characteristics were very good. The nonwoven fabrics of Examples 52 and 58 contained 85% of micro-glass fibers and, therefore, strength was low and they were readily broken at the time of fabrication of batteries, and battery processability and battery characteristics were somewhat inferior. In Example 60, the fiber diameter of micro-glass fibers was great and, therefore, thickness of the nonwoven fabric was somewhat uneven, and battery processability and battery characteristics were somewhat inferior.

The nonwoven fabrics of Examples 57 and 59 subjected to hot calender treatment were superior in processability.

For the nonwoven fabrics of Examples 61 and 62, the fabric containing the micro-glass fibers of the smaller diameter was superior in processability.

On the other hand, since the nonwoven fabric of Example 63 was composed of only the micro-glass fibers having no self-binding power, strength was very low to often cause the trouble of breakage at the time of fabrication of batteries, and non-aqueous electrolyte batteries could not be stably produced.

In the nonwoven fabrics for separator of non-aqueous electrolyte batteries of Examples 64 and 65, since amount of sodium oxide contained in the glass fibers was larger, namely, 10.1% and 15.73%, than in the micro-glass fibers comprising E-glass or silica glass, the sodium ion was replaced with lithium ion during the long-term storage and battery storage characteristics were somewhat inferior.

EXAMPLE 66

50% of the micro-glass fibers used in Example 52 (E-FIBER 108E manufactured by Schuller Co., Ltd.) and 50% of polypropylene fibers at least a part of which were fibrillated to 1 μm or less in fiber diameter (TYARA KY-430S manufactured by Daicel Ltd.) were dispersed in water to prepare a slurry. The slurry was subjected to wet paper making process by a cylinder paper machine to make a nonwoven fabric of 20 g/m² in basis weight and 70 μm thick for separator of non-aqueous electrolyte battery.

EXAMPLE 67

60% of the micro-glass fibers used in Example 52 and 40% of polyethylene fibers at least a part of which were fibrillated to 1 μm or less in fiber diameter (TYARA KY-420S manufactured by Daicel Ltd.) were mixed and dispersed in water to prepare a slurry. The slurry was subjected to wet paper making process by a cylinder paper machine to make a nonwoven fabric of 30 g/m² in basis weight and 110 μm thick for separator of non-aqueous electrolyte battery. Then, the nonwoven fabric was subjected to hot calender treatment at 120° C. to adjust the thicknes to 50 μm.

EXAMPLE 68

40% of the micro-glass fibers having an average fiber diameter of 1 μm used in Example 52 and 60% of p-aramid fibers at least a part of which were fibrillated to 1 μm or less in fiber diameter (TYARA KY-400S manufactured by Daicel Ltd.) were dispersed in water to prepare a slurry. The slurry was subjected to wet paper making process by a cylinder paper machine to make a nonwoven fabric of 30 g/m² in basis weight and 110 μm thick for separator of non-aqueous electrolyte battery. Then, the nonwoven fabric was subjected to a calender treatment at 25° C. to adjust the thicknes to 60 μm.

EXAMPLE 69

60% of the micro-glass fibers used in Example 56 and 40% of p-aramid fibers at least a part of which were fibrillated to 1 μm or less in fiber diameter (TYARA KY-400S manufactured by Daicel Ltd.) were dispersed in water to prepare a slurry. The slurry was subjected to wet paper making process by a cylinder paper machine to make a nonwoven fabric of 20 g/m² in basis weight and 80 μm thick for separator of non-aqueous electrolyte battery.

EXAMPLE 70

60% of the micro-glass fibers having an average fiber diameter of 2.7 μm and comprising 99.8% of silicon dioxide (Q-FIBER, 110Q manufactured by Schuller Co., Ltd.) and 40% of polypropylene fibers at least a part of which were fibrillated to 1 μm or less in fiber diameter (TYARA KY-430S manufactured by Daicel Ltd.) were dispersed in water to prepare a slurry. The slurry was subjected to wet paper making process by a cylinder paper machine to make a nonwoven fabric of 20 g/m² in basis weight and 80 μm thick for separator of non-aqueous electrolyte battery. Then, this nonwoven fabric was subjected to a hot calender treatment at 150° C. to adjust the thickness to 30 μm.

EXAMPLE 71

70% of the micro-glass fibers used in Example 4 and 30% of p-aramid fibers at least a part of which were fibrillated to 1 μm or less in fiber diameter (TYARA KY-400S manufactured by Daicel Ltd.) were dispersed in water to prepare a slurry. The slurry was subjected to wet paper making process by a cylinder paper machine to make a nonwoven fabric of 20 g/m² in basis weight and 80 μm thick for separator of non-aqueous electrolyte battery. Then, the nonwoven fabric was subjected to a calender treatment at 25° C. to adjust the thicknes to 30 μm. The nonwoven fabric had dents on the surface.

EXAMPLE 72

A nonwoven fabric for separator of non-aqueous electrolyte battery was produced in the same manner as in Example 71, except that the average fiber diameter of the micro-glass fibers was 4 μm. The resulting nonwoven fabric had dents on the surface.

EXAMPLE 73

70% of the micro-glass fibers used in Example 64 (108B manufactured by Schuller Co., Ltd.) and 30% of p-aramid fibers at least a part of which were fibrillated to 1 μm or less in fiber diameter (TYARA KY-400S manufactured by Daicel Ltd.) were dispersed in water to prepare a slurry. The slurry was subjected to wet paper making process by a cylinder paper machine to make a nonwoven fabric of 20 g/m² in basis weight and 70 μm thick for separator of non-aqueous electrolyte battery.

EXAMPLE 74

70% of the micro-glass fibers used in Example 65 and 30% of p-aramid fibers at least a part of which were fibrillated to 1 μm or less in fiber diameter (TYARA KY-400S manufactured by Daicel Ltd.) were dispersed in water to prepare a slurry. The slurry was subjected to wet paper making process by a cylinder paper machine to make a nonwoven fabric of 20 g/m² in basis weight and 70 μm thick for separator of non-aqueous electrolyte battery.

EXAMPLE 75

90% of polypropylene fibers (Pz manufactured by Daiwa Spinning Co., Ltd.; 2 d×10 mm in fiber length) and 10% of vinylon fibers (VPB1O7-1×3 manufactured by Kuraray Co., Ltd.) were dispersed in water to prepare a slurry. The slurry was subjected to wet paper making process by a cylinder paper machine to make a nonwoven fabric of 30 g/m² in basis weight and 130 μm thick for separator of non-aqueous electrolyte battery. Then, the nonwoven fabric was subjected to a calender treatment at 25° C. to adjust the thickness to 60 μm.

TABLE 6

| | Battery process-ability | Battery character-istics | Battery storage character-istics | Heat re-sistance (° C.) | Pin holes | Ig-nition |
|---|---|---|---|---|---|---|
| Example 66 | ◯ | ◯ | ◯ | 500< | No | ◯ |
| Example 67 | ◯ | ◯ | ◯ | 500< | No | ◯ |
| Example 68 | ◯ | ◯ | ◯ | 500< | No | ◯ |
| Example 69 | ◯ | ◯ | ◯ | 500< | No | ◯ |
| Example 70 | ◯ | ◯ | ◯ | 500< | No | ◯ |

TABLE 6-continued

|  | Battery process-ability | Battery character-istics | Battery storage character-istics | Heat re-sistance (° C.) | Pin holes | Ig-nition |
|---|---|---|---|---|---|---|
| Example 71 | Δ | Δ | ◯ | 500< | No | ◯ |
| Example 72 | Δ | Δ | ◯ | 500< | No | ◯ |
| Example 73 | ◯ | ◯ | Δ | 500< | No | ◯ |
| Example 74 | ◯ | ◯ | Δ | 500< | No | ◯ |
| Example 75 | ◯ | ◯ | ◯ | 160 | Formed | X |

Evaluation:

As can be seen from the results of Table 6, the nonwoven fabrics for separator of non-aqueous electrolyte batteries of Examples 66–72 according to the present invention were superior in battery processability such as rollability with electrodes, and non-aqueous electrolyte batteries superior in battery characteristics and battery storage characteristics could be obtained. Furthermore, since the nonwoven fabrics contained micro-glass fibers, they were excellent in heat resistance and did not shrink or burn owing to melting of the fibers even when battery temperature rose due to external short-circuit. Thus, ignition of batteries could be inhibited. Furthermore, since the micro-glass fibers contained no sodium oxide which hinders the battery reaction, particularly, battery storage characteristics were superior. The nonwoven fabrics contained organic fibers at least a part of which were fibrillated to 1 μm or less in fiber diameter and, therefore, there were no pin holes which cause internal short-circuit.

In Examples 70–72, the nonwoven fabric of Example 70 was uniform in thickness due to the hot calender treatment, and, hence, battery processability was superior. In Exampes 71 and 72, the nonwoven fabrics were subjected to a normal calender treatment, and hence the battery processability was somewhat inferior irrespective of the fiber diameter.

In the nonwoven fabrics for separator of non-aqueous electrolyte batteries of Examples 73 and 74, since amount of sodium oxide contained in the glass fibers was larger, namely, 10.1% and 15.73%, than in the micro-glass fibers comprising E-glass or silica glass, the sodium ion was replaced with lithium ion during the long-term storage, and battery storage characteristics were somewhat inferior.

The nonwoven fabric of Example 75 did not contain micro-glass fibers and organic fibers at least a part of which were fibrillated to 1 μm or less in fiber diameter and, therefore, it was inferior in heat resistance and had pin holes. Thus, non-aqueous electrolyte batteries made using this nonwoven fabric sometimes got to ignition.

EXAMPLE 76

50% of potassium titanate whiskers (manufactured by Otsuka Chemical Co., Ltd.) and 50% of p-aramid fibers at least a part of which were fibrillated to 1 μm or less in fiber diameter (TYARA KY-400S manufactured by Daicel Ltd.) were dispersed in water and an aqueous aluminum sulfate solution was added thereto to prepare a slurry. The slurry was subjected to wet paper making process by a cylinder paper machine to make a nonwoven fabric of 20 g/m$^2$ in basis weight and 50 μm thick for separator of non-aqueous electrolyte battery.

EXAMPLE 77

50% of aluminum borate whiskers (manufactured by Shikoku Kasei Kogyo Co., Ltd.) and 50% of p-aramid fibers at least a part of which were fibrillated to 1 μm or less in fiber diameter (TYARA KY-400S manufactured by Daicel Ltd.) were dispersed in water and an aqueous aluminum sulfate solution was added thereto to prepare a slurry. The slurry was subjected to wet paper making process by a cylinder paper machine to make a nonwoven fabric of 20 g/m$^2$ in basis weight and 50 μm thick for separator of non-aqueous electrolyte battery.

EXAMPLE 78

50% of potassium titanate whiskers (manufactured by Otsuka Chemical Co., Ltd.) and 50% of polypropylene fibers at least a part of which were fibrillated to 1 μm or less in fiber diameter (TYARA KY-430S manufactured by Daicel Ltd.) were dispersed in water and an aqueous aluminum sulfate solution was added thereto to prepare a slurry. The slurry was subjected to wet paper making process by a cylinder paper machine to make a nonwoven fabric of 20 g/m$^2$ in basis weight and 50 μm thick for separator of non-aqueous electrolyte battery.

EXAMPLE 79

50% of potassium titanate whiskers (manufactured by Otsuka Chemical Co., Ltd.) and 50% of polyethylene fibers at least a part of which were fibrillated to 1 μm or less in fiber diameter (TYARA KY-420S manufactured by Daicel Ltd.) were dispersed in water and an aqueous aluminum sulfate solution was added thereto to prepare a slurry. The slurry was subjected to wet paper making process by a cylinder paper machine to make a nonwoven fabric of 20 g/m$^2$ in basis weight and 50 μm thick for separator of non-aqueous electrolyte battery.

EXAMPLE 80

45% of potassium titanate whiskers (manufactured by Otsuka Chemical Co., Ltd.) and 45% of p-aramid fibers at least a part of which were fibrillated to 1 μm or less in fiber diameter (TYARA KY-400S manufactured by Daicel Ltd.) were dispersed in water and an aqueous aluminum sulfate solution was added thereto to prepare a slurry. Furthermore, 10% of vinylon fibers (VPB107 manufactured by Kuraray Co., Ltd.) as a fibrous binder was added to re-prepare a slurry. The slurry was subjected to wet paper making process by a cylinder paper machine to make a nonwoven fabric of 20 g/m$^2$ in basis weight and 60 μm thick for separator of non-aqueous electrolyte battery.

EXAMPLE 81

40% of potassium titanate whiskers (manufactured by Otsuka Chemical Co., Ltd.) and 40% of p-aramid fibers at least a part of which were fibrillated to 1 μm or less in fiber diameter (TYARA KY-400S manufactured by Daicel Ltd.) were dispersed in water and an aqueous aluminum sulfate solution was added thereto to prepare a slurry. Furthermore, 20% of heat melting binder fibers (NBF-H manufactured by Daiwa Spinning Co., Ltd.) as a fibrous binder was added to re-prepare a slurry. The resulting slurry was subjected to wet paper making process by a cylinder paper machine to make a nonwoven fabric of 20 g/m$^2$ in basis weight and 60 μm thick for separator of non-aqueous electrolyte battery.

EXAMPLE 82

A nonwoven fabric of 20 g/m$^2$ in basis weight and 50 μm thick for separator of non-aqueous electrolyte battery was made in the same manner as in Example 80, except that amount of the potassium titanate whiskers was 30%, amount of the fibrillated p-aramid fibers was 60% and amount of the vinylon fibers was 10%.

EXAMPLE 83

A nonwoven fabric of 20 g/m$^2$ in basis weight and 50 μm thick for separator of non-aqueous electrolyte battery was made in the same manner as in Example 80, except that amount of the potassium titanate whiskers was 30%, amount of the fibrillated p-aramid fibers was 50% and amount of the vinylon fibers was 20%.

EXAMPLE 84

A nonwoven fabric of 20 g/m$^2$ in basis weight and 50 μm thick for separator of non-aqueous electrolyte battery was made in the same manner as in Example 81, except that amount of the potassium titanate whiskers was 80% and amount of the fibrillated p-aramid fibers was 20%.

EXAMPLE 85

A nonwoven fabric of 20 g/m$^2$ in basis weight and 50 μm thick for separator of non-aqueous electrolyte battery was made in the same manner as in Example 80, except that amount of the potassium titanate whiskers was 80%, amount of the fibrillated p-aramid fibers was 2% and amount of the vinylon fibers was 18%.

EXAMPLE 86

A nonwoven fabric of 20 g/m$^2$ in basis weight and 50 μm thick for separator of non-aqueous electrolyte battery was made in the same manner as in Example 76, except that amount of the potassium titanate whiskers was 25% and amount of the fibrillated p-aramid fibers was 75%.

EXAMPLE 87

A nonwoven fabric of 20 g/m$^2$ in basis weight and 45 μm thick for separator of non-aqueous electrolyte battery was made in the same manner as in Example 76, except that amount of the potassium titanate whiskers was 90% and amount of the fibrillated p-polyamide fibers was 10%.

EXAMPLE 88

100% of potassium titanate whiskers were dispersed in water and aluminum sulfate was added thereto to prepare an agglomerate slurry. The slurry was subjected to wet paper making process by a cylinder paper machine, but most of the whiskers passed through the net and it was very difficult to form the slurry a sheet. Moreover, strength of wet web at the stage of web formation was also weak and formation of sheet was difficult. The resulting nonwoven fabric had no binding power and was fragile.

EXAMPLE 89

A slurry comprising 50% of fibrillated p-aramid fibers, 40% of NBF-H (manufactured by Daiwa Spinning Co., Ltd.; 0.7 d×5 mm in fiber length) and 10% of vinylon fibers (VPB107-1×3 manufactured by Kuraray Co., Ltd.) was prepared, and the slurry was subjected to wet paper making process by a cylinder paper machine to make a nonwoven fabric of 20 g/m$^2$ in basis weight and 70 μm thick for separator of non-aqueous electrolyte battery.

EXAMPLE 90

50% of potassium titanate whiskers were dispersed in water and aluminum sulfate was added thereto to prepare an agglomerate slurry. Thereto were added 40% of NBF-H (manufactured by Daiwa Spinning Co., Ltd.; 0.7 d×5 mm in fiber length) and 10% of vinylon fibers (VPB107-1×3 manufactured by Kuraray Co., Ltd.) to prepare a slurry. The slurry was subjected to wet paper making process by a cylinder paper machine to make a nonwoven fabric of 20 g/m$^2$ in basis weight and 70 μm thick for separator of non-aqueous electrolyte battery.

EXAMPLE 91

50% of the micro-glass fibers used in Example 73 (108B manufactured by Schuller Co., Ltd.) and 50% of fibrillated p-aramid fibers were dispersed in water to prepare a slurry. The slurry was subjected to wet paper making process by a cylinder paper machine to make a nonwoven fabric of 20 g/m$^2$ in basis weight and 60 μm thick for separator of non-aqueous electrolyte battery.

TABLE 7

| | Battery processability | Battery characteristics | Battery storage characteristics | Heat resistance (° C.) | Pin holes | Ignition |
|---|---|---|---|---|---|---|
| Example 76 | ○ | ○ | ○ | 500< | No | ○ |
| Example 77 | ○ | ○ | ○ | 500< | No | ○ |
| Example 78 | ○ | ○ | ○ | 500< | No | ○ |
| Example 79 | ○ | ○ | ○ | 500< | No | ○ |
| Example 80 | ○ | ○ | ○ | 500< | No | ○ |
| Example 81 | ○ | ○ | ○ | 500< | No | ○ |
| Example 82 | ○ | ○ | ○ | 450 | No | ○ |
| Example 83 | ○ | ○ | ○ | 400 | No | ○ |
| Example 84 | ○ | ○ | ○ | 500< | No | ○ |
| Example 85 | ○ | ○ | ○ | 500< | No | ○ |
| Example 86 | ○ | ○ | ○ | 350 | No | ○ |
| Example 87 | Δ | Δ | ○ | 500< | No | ○ |
| Example 88 | X | — | — | — | Formed | — |
| Example 89 | ○ | ○ | ○ | 200 | No | ○ |
| Example 90 | Δ | Δ | ○ | 500 | Formed | X |
| Example 91 | ○ | ○ | Δ | 500< | No | ○ |

Evaluation:

As can be seen from the results of Table 7, the nonwoven fabrics for separator of non-aqueous electrolyte battery which were prepared in Examples 76–87, 89 and 91 according to the present invention were superior in battery processability such as rollability with electrodes, and non-aqueous electrolyte batteries superior in battery characteristics and battery storage characteristics could be made. Furthermore, since the nonwoven fabrics contained organic fibers at least a part of which were fibrillated to 1 μm or less in fiber diameter, there were formed no pin holes which cause internal short-circuit. Since the nonwoven fabrics of Examples 76–87 contained whiskers and the nonwoven fabric of Example 89 contained p-aramid fibers, they were excellent in heat resistance and did not shrink or burn owing to melting of the fibers even when battery temperature rose due to external short-circuit. Thus, ignition of batteries could be inhibited. The nonwoven fabric of Example 87 had a whisker content of 90%, and it was low in strength and somewhat inferior in battery processability and battery characteristics.

On the other hand, the nonwoven fabric of Example 88 was composed of only the whiskers having no self-binding power, and therefore it was very low in strength and was fragile. Thus, processing to battery was impossible. Accordingly, non-aqueous electrolyte batteries could not be made using the nonwoven fabric.

Since the nonwoven fabric of Example 90 contained micro-glass fibers, it was superior in heat resistance, but there were formed pin holes, and internal short-circuit occurred in the non-aqueous electrolyte batteries made using this nonwoven fabric and this sometimes led to ignition.

Since the nonwoven fabric of Example 91 contained micro-glass fibers, it was superior in heat resistance, but because the micro-glass fibers contained sodium oxide which hinders the battery reaction, the sodium ion was replaced with lithium ion during storage and non-aqueous electrolyte batteries made using this nonwoven fabric were somewhat inferior in battery storage characteristics.

EXAMPLE 92

70% of p-aramid fibers at least a part of which were fibrillated to 1 μm or less in fiber diameter (TYARA KY-400S manufactured by Daicel Ltd.) and 30% of core-sheath composite fibers comprising polypropylene and polyethylene (NBF-H manufactured by Daiwa Spinning Co., Ltd.; 2 d×5 mm in fiber length) as other fibers were dispersed in water to prepare a slurry. The slurry was subjected to wet paper making process by a cylinder paper machine to make a nonwoven fabric of 30 g/m² in basis weight for separator of non-aqueous electrolyte battery. Then, this nonwoven fabric was subjected to a hot calender treatment at 130° C. to adjust the thickness to 125 μm. This nonwoven fabric had no pin holes.

EXAMPLE 93

30% of polypropylene fibers at least a part of which were fibrillated to 1 μm or less in fiber diameter (TYARA KY-430S manufactured by Daicel Ltd.) and 30% of polypropylene fibers (Pz manufactured by Daiwa Spinning Co., Ltd.; 0.5 d, 5 mm in fiber length) and 40% of core-sheath composite fibers comprising polypropylene and polyethylene (NBF-H manufactured by Daiwa Spinning Co., Ltd.; 0.7 d, 5 mm in fiber length) as other fibers were dispersed in water to prepare a slurry. The slurry was subjected to wet paper making process by a cylinder paper machine to make a nonwoven fabric of 25 g/m² in basis weight and 105 μm thick for separator of non-aqueous electrolyte battery. This nonwoven fabric had no pin holes.

EXAMPLE 94

A nonwoven fabric of 25 g/m² in basis weight was made in the same manner as in Example 93. Then, this nonwoven fabric was subjected to a hot calender treatment at 130° C. to adjust the thickness to 61 μm. This nonwoven fabric had no pin holes.

EXAMPLE 95

A nonwoven fabric of 25 g/m² in basis weight was made in the same manner as in Example 93. Then, this nonwoven fabric was subjected to a hot calender treatment at 130° C. to adjust the thickness to 42 μm. This nonwoven fabric had no pin holes.

EXAMPLE 96

50% of polyethylene fibers at least a part of which were fibrillated to 1 μm or less in fiber diameter (TYARA KY-420S manufactured by Daicel Ltd.) and 50% of core-sheath composite fibers comprising polypropylene and polyethylene (NBF-H manufactured by Daiwa Spinning Co., Ltd.; 0.7 d×5 mm in fiber length) as other fibers were dispersed in water to prepare a slurry. The slurry was subjected to wet paper making process by a cylinder paper machine to make a nonwoven fabric of 26 g/m² in basis weight for separator of non-aqueous electrolyte battery. Then, the nonwoven fabric was subjected to a hot calender treatment at 120° C. to adjust the thickness to 70 μm. This nonwoven fabric had no pin holes.

EXAMPLE 97

A nonwoven fabric of 26 g/m² in basis weight was made in the same manner as in Example 96. Then, this nonwoven fabric was subjected to a hot calender treatment at 120° C. to adjust the thickness to 46 μm. This nonwoven fabric had no pin holes.

EXAMPLE 98

Poly-p-phenylenebenzobisoxazole fibers (PBO manufactured by Toyobo Co., Ltd.) were dispersed in water at a concentration of 2%. The dispersion was introduced into a high-pressure homogenizer and repeatedly passed therethrough under a pressure of 300 kg/cm² to fibrillate the fibers. 50% of the thus obtained poly-p-phenylenebenzobisoxazole fibers at least a part of which were fibrillated to 1 μm or less in fiber diameter and 50% of core-sheath composite fibers comprising polypropylene and polyethylene (NBF-H manufactured by Daiwa Spinning Co., Ltd.; 0.7 d×5 mm in fiber length) as other fibers were dispersed in water to prepare a slurry. The slurry was subjected to wet paper making process by a cylinder paper machine to make a nonwoven fabric of 30 g/m² in basis weight for separator of non-aqueous electrolyte battery. Then, this nonwoven fabric was subjected to a hot calender treatment at 140° C. to adjust the thickness to 51 μm. This nonwoven fabric had no pin holes.

EXAMPLE 99

35% of the micro-glass fibers used in Example 4, 25% of polypropylene fibers at least a part of which were fibrillated to 1 μm or less in fiber diameter (TYARA KY-430S manufactured by Daicel Ltd.) and 40% of core-sheath composite fibers comprising polypropylene and polyethylene (NBF-H manufactured by Daiwa Spinning Co., Ltd.; 0.7 d×5 mm in fiber length) as other fibers were dispersed in water to prepare a slurry. The slurry was subjected to wet paper making process by a cylinder paper machine to make a nonwoven fabric of 25 g/m² in basis weight for separator of non-aqueous electrolyte battery. Then, the nonwoven fabric was subjected to hot calender treatment at 130° C. to adjust the thickness to 45 μm. This nonwoven fabric had no pin holes.

EXAMPLE 100

35% of the micro-glass fibers used in Example 4, 25% of polyethylene fibers at least a part of which were fibrillated to 1 μm or less in fiber diameter (TYARA KY-420S manufactured by Daicel Ltd.) and 40% of core-sheath composite fibers comprising polypropylene and polyethylene (NBF-H manufactured by Daiwa Spinning Co., Ltd.; 0.7 d×5 mm in fiber length) as other fibers were dispersed in water to prepare a slurry. The slurry was subjected to wet paper making process by a cylinder paper machine to make a nonwoven fabric of 25 g/m² in basis weight for separator of non-aqueous electrolyte battery. Then, the nonwoven fabric was subjected to hot calender treatment at 120° C. to adjust the thickness to 40 μm. This nonwoven fabric had no pin holes.

EXAMPLE 101

35% of the micro-glass fibers used in Example 4, 25% of poly-p-phenylenebenzobisoxazole fibers at least a part of which were fibrillated to 1 μm or less in fiber diameter and which were prepared in Example 98 and 40% of core-sheath composite fibers comprising polypropylene and polyethylene (NBF-H manufactured by Daiwa Spinning Co., Ltd.; 0.7 d×5 mm in fiber length) as other fibers were dispersed in water to prepare a slurry. The slurry was subjected to wet paper making process by a cylinder paper machine to make a nonwoven fabric of 30 g/m² in basis weight for separator of non-aqueous electrolyte battery. Then, the nonwoven fabric was subjected to hot calender treatment at 140° C. to adjust the thickness to 49 μm. This nonwoven fabric had no pin holes.

EXAMPLE 102

50% of polypropylene fibers at least a part of which were fibrillated to 1 μm or less in fiber diameter (TYARA KY-430S manufactured by Daicel Ltd.) and 50% of core-sheath composite fibers comprising polypropylene and polyethylene (NBF-H manufactured by Daiwa Spinning Co., Ltd.; 0.7 d×5 mm in fiber length) as other fibers were dispersed in water to prepare a slurry. The slurry was subjected to wet paper making process by a cylinder paper machine to make a nonwoven fabric of 25 g/m² in basis weight for separator of non-aqueous electrolyte battery. Then, the nonwoven fabric was subjected to hot calender treatment at 140° C. to adjust the thickness to 40 μm. This nonwoven fabric had no pin holes.

EXAMPLE 103

50% of polyethylene fibers at least a part of which were fibrillated to 1 μm or less in fiber diameter (TYARA KY-420S manufactured by Daicel Ltd.) and 50% of core-sheath composite fibers comprising polypropylene and polyethylene (NBF-H manufactured by Daiwa Spinning Co., Ltd.; 0.7 d×5 mm in fiber length) as other fibers were dispersed in water to prepare a slurry. The slurry was subjected to wet paper making process by a cylinder paper machine to make a nonwoven fabric of 25 g/m² in basis weight for separator of non-aqueous electrolyte battery. Then, the nonwoven fabric was subjected to hot calender treatment at 130° C. to adjust the thickness to 40 μm. This nonwoven fabric had no pin holes.

EXAMPLE 104

90% of acrylic fibers (Vonnel manufactured by Mitsubishi Rayon Co., Ltd.; 1 d×5 mm in fiber length) and 10% of core-sheath composite fibers comprising polypropylene and polyethylene (NBF-H manufactured by Daiwa Spinning Co., Ltd.; 0.7 d×5 mm in fiber length) were dispersed in water to prepare a slurry. The slurry was subjected to wet paper making process by a cylinder paper machine to make a nonwoven fabric of 20 g/m² in basis weight and 94 μm in thickness for separator of non-aqueous electrolyte battery. This nonwoven fabric had pin holes.

TABLE 8

|  | Battery process-ability | Void content (%) | Gas permeability (mmHg) | Retention of electrolyte | Penetration of electrolyte | Heat resistance (° C.) |
| --- | --- | --- | --- | --- | --- | --- |
| Example 92 | ○ | 82 | 720< | Δ | ○ | 350 |
| Example 93 | ○ | 74 | 720< | ○ | ○ | 160 |
| Example 94 | ○ | 55 | 590 | ○ | ○ | 160 |
| Example 95 | ○ | 35 | 100 | Δ | Δ | 160 |
| Example 96 | ○ | 60 | 635 | ○ | ○ | 130 |
| Example 97 | ○ | 40 | 255 | ○ | ○ | 130 |
| Example 98 | ○ | 50 | 520 | ○ | ○ | 300 |
| Example 99 | ○ | 60 | 630 | ○ | ○ | 500< |
| Example 100 | ○ | 55 | 590 | ○ | ○ | 500< |
| Example 101 | ○ | 60 | 630 | ○ | ○ | 500< |
| Example 102 | ○ | 33 | 80 | X | X | 160 |
| Example 103 | ○ | 33 | 80 | X | X | 130 |
| Example 104 | Δ | 81 | 720< | X | X | 200 |

Evaluation:

Since the nonwoven fabrics contained organic fibers at least a part of which were fibrillated to 1 μm or less in fiber diameter, there were no pin holes which cause internal short-circuit.

The nonwoven fabrics for separator of non-aqueous electrolyte batteries of Examples 93–101 had a void content of 35–80% and hence were superior in retention of electrolyte. Furthermore, since they had a gas permeability of 100 mmHg or higher, they are superior in penetration of electrolyte.

On the other hand, since the nonwoven fabrics of Examples 102 and 103 were subjected to severe hot calender treatment, they were high in uniformity, but became filmy and inferior in penetration of electrolyte and retention of electrolyte.

Since the nonwoven fabric of Example 104 did not contain organic fibers at least a part of which were fibrillated to 1 μm or less in fiber diameter, it had pin holes and, furthermore, since the nonwoven fabric contained acrylic fibers having a large fiber diameter, it was non-uniform in thickness and was somewhat inferior in battery processability such as rollability with electrodes as compared with the nonwoven fabrics made in Examples 92–101, and was inferior in penetration of electrolyte and retention of electrolyte.

EXAMPLE 105

50% of micro-glass fibers used in Example 4 (Q-FIBER #106Q manufactured by Schuller Co., Ltd.), 35% of polyarylate fibers (VECTRAN manufactured by Kuraray Co., Ltd.) and 15% of polyarylate pulp (VECTRAN manufactured by Kuraray Co., Ltd.) as heat resistant fibers were dispersed in water to prepare a slurry. The slurry was subjected to wet paper making process by a cylinder paper machine to make a nonwoven fabric of 25 g/m² in basis weight and 90 μm in thickness for separator of non-aqueous electrolyte battery. Then, the nonwoven fabric was subjected

EXAMPLE 106

A nonwoven fabric of 25 g/m$^2$ in basis weight and 90 μm in thickness was made in the same manner as in Example 105. Then, this nonwoven fabric was subjected to hot calender treatment at 50° C. to adjust the thickness to 40 μm.

EXAMPLE 107

A nonwoven fabric of 25 g/m$^2$ in basis weight and 90 μm in thickness was made in the same manner as in Example 105. Then, this nonwoven fabric was subjected to hot calender treatment at 150° C. to adjust the thickness to 40 μm.

EXAMPLE 108

A nonwoven fabric of 25 g/m$^2$ in basis weight and 90 μm in thickness was made in the same manner as in Example 105. Then, this nonwoven fabric was subjected to hot calender treatment at 200° C. to adjust the thickness to 40 μm.

The nonwoven fabrics for separator of non-aqueous electrolyte battery which were made in Examples 106–108 had a void content of 64%.

EXAMPLE 109

A nonwoven fabric of 25 g/m$^2$ in basis weight and 90 μm in thickness was made in the same manner as in Example 105. Then, this nonwoven fabric was subjected to hot calender treatment at 210° C. As a result, the nonwoven fabric had a thickness of 35 μm and had a void content of 57%, which was lower than in Examples 106–108. Especially, the void content near the surface decreased.

EXAMPLE 110

70% of the micro-glass fibers used in Example 4 and 10% of polyarylate fibers (VECTRAN manufactured by Kuraray Co., Ltd.) and 20% of polyarylate pulp (VECTRAN manufactured by Kuraray Co., Ltd.) as heat resistant fibers were dispersed in water to prepare a slurry. The slurry was subjected to wet paper making process by a cylinder paper machine to make a nonwoven fabric of 25 g/m$^2$ in basis weight and 90 μm in thickness for separator of non-aqueous electrolyte battery. Then, the nonwoven fabric was subjected to hot calender treatment at 150° C. to adjust the thickness to 40 μm. The nonwoven fabric had a void content of 68%.

EXAMPLE 111

60% of the micro-glass fibers used in Example 4 and 30% of polyphenylene sulfide fibers (manufactured by Toray Industries, Ltd.) and 10% of polyarylate pulp (VECTRAN manufactured by Kuraray Co., Ltd.) as heat resistant fibers were dispersed in water to prepare a slurry. The slurry was subjected to wet paper making process by a cylinder paper machine to make a nonwoven fabric of 25 g/m$^2$ in basis weight and 90 μm in thickness for separator of non-aqueous electrolyte battery. Then, the nonwoven fabric was subjected to hot calender treatment at 150° C. to adjust the thickness to 40 μm. The nonwoven fabric had a void content of 66%.

EXAMPLE 112

40% of the micro-glass fibers used in Example 4, 20% of polyarylate fibers (VECTRAN manufactured by Kuraray Co., Ltd.) and 20% of polyarylate pulp (VECTRAN manufactured by Kuraray Co., Ltd.) as heat resistant fibers, and 20% of polyolefin fibers (NBF-H manufactured by Daiwa Spinning Co., Ltd.; 2 d×5 mm) were dispersed in water to prepare a slurry. The slurry was subjected to wet paper making process by a cylinder paper machine to make a nonwoven fabric of 25 g/m$^2$ in basis weight and 90 μm in thickness for separator of non-aqueous electrolyte battery. Then, the nonwoven fabric was subjected to hot calender treatment at 150° C. to adjust the thickness to 40 μm. The nonwoven fabric had a void content of 58%.

EXAMPLE 113

50% of the micro-glass fibers used in Example 3 (#108A manufactured by Schuller Co., Ltd.) and 35% of aramid fibers (Kevlar manufactured by DuPont de Nemours, E.I., Co.) and 15% of aramid pulp (Kevlar manufactured by DuPont de Nemours, E.I., Co.) as heat resistant fibers were dispersed in water to prepare a slurry. The slurry was subjected to wet paper making process by a cylinder paper machine to make a nonwoven fabric of 25 g/m$^2$ in basis weight and 90 μm in thickness for separator of non-aqueous electrolyte battery. Then, the nonwoven fabric was subjected to hot calender treatment at 150° C. to adjust the thickness to 40 μm. The nonwoven fabric had a void content of 59%.

EXAMPLE 114

50% of micro-glass fibers having an average fiber diameter of 1.0 μm (#108A manufactured by Schuller Co., Ltd.) and 50% of p-aramid fibers (Kevlar manufactured by DuPont de Nemours, E.I., Co.) as heat resistant fibers were formed into a sheet by carding which is a dry method for making nonwoven fabric, whereby a nonwoven fabric of 25 g/m$^2$ in basis weight and 500 μm in thickness for separator of non-aqueous electrolyte battery was obtained. The resulting nonwoven fabric was non-uniform and retention of the micro-glass fibers was inferior. Then, the nonwoven fabric was subjected to hot calender treatment at 150° C. to adjust the thickness to 40 μm. The resulting nonwoven fabric had a void content of 70%.

EXAMPLE 115

70% of polyarylate fibers (VECTRAN manufactured by Kuraray Co., Ltd.) and 30% of polyarylate pulp (VECTRAN manufactured by Kuraray Co., Ltd.) as heat resistant fibers were dispersed in water to prepare a slurry. The slurry was subjected to wet paper making process by a cylinder paper machine to make a nonwoven fabric of 25 g/m$^2$ in basis weight and 90 μm in thickness for separator of non-aqueous electrolyte battery. Then, the nonwoven fabric was subjected to hot calender treatment at 200° C. to adjust the thickness to 40 μm.

EXAMPLE 116

A nonwoven fabric for separator of non-aqueous electrolyte battery was made in the same manner as in Example 115, except that polyphenylene sulfide fibers (PPS CHOPPED FIBER manufactured by Toray Industries, Ltd.) were used in place of the polyarylate fibers.

EXAMPLE 117

30% of micro-glass fibers having an average fiber diameter of 1.0 μm (#108A manufactured by Schuller Co., Ltd.), 20% of polyolefin fibers (NBF-H manufactured by Daiwa Spinning Co., Ltd.; 2 d×5 mm) and 50% of polyolefin fibers (PZ manufactured by Daiwa Spinning Co., Ltd.; 0.5 d×5 mm) were mixed and dispersed in water to prepare a slurry. The slurry was subjected to wet paper making process by a cylinder paper machine to make a nonwoven fabric of 25 g/m² in basis weight and 100 μm in thickness for separator of non-aqueous electrolyte battery. Then, the nonwoven fabric was subjected to hot calender treatment at 150° C. to adjust the thickness to 40 μm.

TABLE 9

|  | Battery process-ability | Battery character-istics | Battery storage character-istics | Heat re-sistance (° C.) | Pin holes | Ig-nition |
|---|---|---|---|---|---|---|
| Example 105 | △ | ○ | ○ | 500< | No | ○ |
| Example 106 | ○ | ○ | ○ | 500< | No | ○ |
| Example 107 | ○ | ○ | ○ | 500< | No | ○ |
| Example 108 | ○ | ○ | ○ | 500< | No | ○ |
| Example 109 | ○ | ○ | ○ | 500< | No | ○ |
| Example 110 | ○ | ○ | ○ | 500< | No | ○ |
| Example 112 | ○ | ○ | △ | 500< | No | ○ |
| Example 113 | ○ | ○ | ○ | 500< | No | ○ |
| Example 114 | △ | △ | △ | 500< | No | ○ |
| Example 115 | ○ | ○ | ○ | 250 | No | ○ |
| Example 116 | ○ | ○ | ○ | 270 | No | ○ |
| Example 117 | ○ | ○ | △ | 400 | No | ○ |

Evaluation:

As can be seen from the results of Table 9, among Examples 105–109, since the hot calendering temperature in Example 105 was 40° C., the effect of hot calender treatment was low and the thickness was non-uniform. Since the hot calendering temperature in Examples 106–108 was 50–200° C., the thickness was uniform. Since the hot calendering temperature in Example 109 was 210° C., the thickness was further uniform, but void content decreased and retention of electrolyte was somewhat deteriorated. In Example 109, penetration of the electrolyte also deteriorated as compared with Examples 106–108.

The nonwoven fabrics for separator of non-aqueous electrolyte battery which were made in Examples 105–114 and Examples 115–117 were superior in adhesion to electrodes and superior in battery processability such as rollability with electrodes, and non-aqueous electrolyte batteries superior in battery characteristics and battery storage characteristics could be made. Furthermore, since the nonwoven fabrics contained micro-glass fibers, they were superior in heat resistance and short-circuit of electrodes due to shrinking or burning of the nonwoven fabrics and ignition of batteries could be inhibited. Furthermore, since at least a part of the polyarylate pulp was fibrillated to 1 μm or less in fiber diameter, there were no pin holes which cause internal short-circuit. The nonwoven fabrics of Examples 112, 114 and 117 contained micro-glass fibers containing sodium oxide which hinders the battery reaction, and, therefore, the batteries were somewhat inferior in battery storage characteristics.

The nonwoven fabrics of Examples 115 and 116 were composed of only heat resistant fibers, and therefore superior in heat resistance and could inhibit ignition of batteries, but were inferior to those containing micro-glass fibers. Furthermore, they contained 30% of organic fibers at least a part of which were fibrillated to 1 μm or less in fiber diameter and hence due to the effect of hot calender treatment, there were no pin holes which cause internal short-circuit. Thus, uniform nonwoven fabrics could be made and battery processability such as rollability with electrodes was superior, and non-aqueous electrolyte batteries excellent in battery characteristics and battery storage characteristics could be made.

INDUSTRIAL APPLICABILITY

The nonwoven fabric for separator of non-aqueous electrolyte battery according to the present invention is superior in adhesion to electrodes, and there occurs no breakage of the separator at the time of fabrication of battery and there occurs neither slippage nor space between electrode and the separator. Battery processability such as rollability with electrodes is superior. Furthermore, even when electrodes generate heat owing to external short-circuit, internal short-circuit due to contact between electrodes caused by shrinking or burning of the nonwoven fabric does not occur, and ignition of the battery can be inhibited. The nonwoven fabric has no pin holes and is superior in retention of electrolyte and penetration of electrolyte. The nonwoven fabric can be used as a separator of non-aqueous electrolyte battery superior in current capacity, battery characteristics and battery storage characteristics.

What is claimed is:

1. A nonwoven fabric for separators of non-aqueous electrolyte batteries which is produced by a wet paper making process, comprising:

a nonwoven fabric constituted of organic fibers wherein the length of the fibers is 1–30 mm, the nonwoven fabric has a thickness of 10–100 μm and the nonwoven fabric has a thickness non-uniformity index (Rpy) in machine direction of 1000 mV or less as determined below:

thickness non-uniformity index (Rpy): a sample is allowed to run between two spherical tracers; variation of thickness of the sample in machine direction is measured using a film thickness measuring equipment which measures the variation of sample thickness as an electric signal through an electric micrometer by scanning the sample at a constant rate of 1.5 m/min in machine direction after zero point adjustment under the condition of ±15 μm/±3 V in sensitivity range of the electric micrometer; the resulting signal value is subjected to fast Fourier transform by a FFT analyzer using hanning window as a time window; a power spectrum (unit: mV²) is obtained by addition averaging of addition of 128 times; the power values in the frequency band of 2–25 Hz are totaled; the total is multiplied by ⅔; and the resulting value is raised to one-second power to obtain the thickness non-uniformity index (Rpy) (unit: mV).

2. A nonwoven fabric for separators of non-aqueous electrolyte batteries which is produced by a wet paper making process, comprising:

a nonwoven fabric constituted of organic fibers wherein the length of the fibers is 1–30 mm, the nonwoven fabric has a thickness of 10–100 μm and the nonwoven fabric has a center surface average roughness Sra of 6 μm or less in whole wavelength region as measured using a tracer method three-dimensional surface roughness meter.

3. A nonwoven fabric for separators of non-aqueous electrolyte batteries according to claim 1 or 2 which further contains inorganic fibers.

4. A nonwoven fabric for separators of non-aqueous electrolyte batteries according to claim 3, wherein the inorganic fibers are one or more kinds of fibers selected from micro-glass fibers, alumina fibers, alumina silica fibers and rock wool.

5. A nonwoven fabric for separators of non-aqueous electrolyte batteries according to claim 1 or 2 which contains whiskers comprising an inorganic compound.

6. A nonwoven fabric for separators of non-aqueous electrolyte batteries according to claim 5, wherein the composition of the whiskers comprises at least one member selected from $Al_2O_3$, $9Al_2O_3 \cdot 2B_2O_3$, $SiC$, $Si_3N_4$, $K_2O \cdot 6TiO_2$, $K_2Ti_5O_{13}$, $TiO_2$, $BaTiO_3$, $Mg_2B_2O_5$ and $ZnO$.

7. A nonwoven fabric for separators of non-aqueous electrolyte batteries according to claim 3, wherein the average fiber diameter of the inorganic fibers is 3 µm or less.

8. A nonwoven fabric for separators of non-aqueous electrolyte batteries according to claim 3, wherein the amount of the inorganic fibers in the nonwoven fabric is 20–80% by weight.

9. A nonwoven fabric for separators of non-aqueous electrolyte batteries according to claim 4, 7 or 8, wherein the micro-glass fibers comprise at least one of E glass containing 1% by weight or less of sodium oxide and silica glass containing 99% by weight or more of silicon dioxide.

10. A nonwoven fabric for separators of non-aqueous electrolyte batteries according to claim 1 or 2, wherein at least a part of the organic fibers are fibrillated to 1 µm or less in fiber diameter.

11. A nonwoven fabric for separators of non-aqueous electrolyte batteries according to claim 1 or 2 which has a void content of 35–80%.

12. A nonwoven fabric for separators of non-aqueous electrolyte batteries according to claim 1 or 2, which has a gas permeability of 100 mmHg or higher.

13. A nonwoven fabric for separators of non-aqueous electrolyte batteries according to claim 1 or 2, wherein the organic fibers comprise one or more kinds of organic fibers selected from polypropylene fibers, polyethylene fibers, polymethylpentene fibers and acrylic fibers.

14. A nonwoven fabric for separators of non-aqueous electrolyte batteries according to claim 1 or 2, which contains heat resistant organic fibers having a melting point or heat decomposition point of 250° C. or higher.

15. A nonwoven fabric for separators of non-aqueous electrolyte batteries according to claim 1 or 2, wherein the heat resistant organic fibers comprise one or more kinds of fibers selected from the group consisting of aramid fibers, polyphenylene sulfide fibers, polyarylate fibers, polyether ketone fibers, polyimide fibers, polyether sulfone fibers, and poly-p-phenylenebenzobisoxazole fibers.

16. A nonwoven fabric for separators of non-aqueous electrolyte batteries according to claim 1 or 2, wherein the organic fibers contain a fibrous binder.

17. A nonwoven fabric for separators of non-aqueous electrolyte batteries according to claim 16, wherein the fibrous binder is at least one fibrous binder selected from the group consisting of vinylon fibers, polyester fibers, polyolefin fibers, polyamide fibers and natural pulps.

18. A nonwoven fabric for separators of non-aqueous electrolyte batteries according to claim 1 or 2, which is subjected to a calender treatment.

19. A nonwoven fabric for separators of non-aqueous electrolyte batteries according to claim 18, wherein the calender treatment is a hot calender treatment.

20. A nonwoven fabric for separators of non-aqueous electrolyte batteries according to claim 19, which is subjected to a hot calender treatment at 50–200° C.

21. A non-aqueous electrolyte battery which is made using the nonwoven fabric according to claim 1 or 2.

* * * * *